US007353258B2

(12) United States Patent
Washburn

(10) Patent No.: US 7,353,258 B2
(45) Date of Patent: Apr. 1, 2008

(54) INTERACTIVE MESSAGING SYSTEM

(75) Inventor: Carl Washburn, San Diego, CA (US)

(73) Assignee: Vocel, Inc., San Diego, CA (US)

( * ) Notice: Subject to any disclaimer, the term of this patent is extended or adjusted under 35 U.S.C. 154(b) by 230 days.

(21) Appl. No.: 11/103,114

(22) Filed: Apr. 11, 2005

(65) Prior Publication Data

US 2005/0188090 A1   Aug. 25, 2005

(51) Int. Cl.
*G06F 15/16* (2006.01)
(52) U.S. Cl. .................. 709/206; 709/203; 709/204; 455/406; 705/14
(58) Field of Classification Search ............. 709/203, 709/206, 224, 204; 455/406; 705/14
See application file for complete search history.

(56) References Cited

U.S. PATENT DOCUMENTS

| | | | | |
|---|---|---|---|---|
| 5,704,029 | A * | 12/1997 | Wright, Jr. .................. 715/505 |
| 6,769,009 | B1 * | 7/2004 | Reisman ..................... 709/203 |
| 6,873,688 | B1 * | 3/2005 | Aarnio ........................ 455/2.01 |
| 6,961,327 | B2 * | 11/2005 | Niu ............................. 370/338 |
| 6,968,178 | B2 * | 11/2005 | Pradhan et al. ............ 455/406 |
| 6,978,118 | B2 * | 12/2005 | Vesikivi et al. ............ 455/41.1 |
| 6,987,945 | B2 * | 1/2006 | Corn et al. .................. 709/224 |
| 2003/0142039 | A1 * | 7/2003 | Minear et al. .............. 345/2.3 |
| 2004/0254836 | A1 * | 12/2004 | Emoke Barabas et al. ... 705/14 |
| 2006/0240851 | A1 * | 10/2006 | Washburn .................. 455/466 |
| 2006/0256130 | A1 * | 11/2006 | Gonzalez .................... 345/619 |
| 2007/0100648 | A1 * | 5/2007 | Borquez et al. ............. 705/1 |

* cited by examiner

*Primary Examiner*—Abdullahi Salad
*Assistant Examiner*—Ramy M Osman
(74) *Attorney, Agent, or Firm*—Loza & Loza, LLP; Heidi L. Eisenhut

(57) ABSTRACT

The interactive messaging system of the present invention provides for an interactive communication process between users, both senders and recipients. The sender composes a message by filling in a template stored in data services. Once completed, the sender pushes the message to a recipient's wireless device if the wireless device contains a WAP browser which is capable of receiving pushed messages. Typically the message includes a question along with answers for the recipient to choose from. Each answer corresponds with a pre-assigned response key and the recipient answers the question by selecting one of the pre-assigned response keys. The recipient's response is available to the sender in the form of an e-mail, WAP Push, on-line access or interactive message that is shown to the sender on an on-line status screen.

6 Claims, 26 Drawing Sheets

INTERACTIVE MESSAGING SYSTEM

This application claims the benefit of priority of U.S. non-provisional application Ser. No. 10/395,187 filed Mar. 21, 2003.

FIELD OF THE INVENTION

The present invention relates generally to the field of text messaging. More particularly, the present invention relates to an interactive messaging system.

BACKGROUND OF THE INVENTION

Today, wireless or mobile devices are becoming more common as wireless carriers build out their networks, rates decrease and device technology increases. Users of the wireless devices have been able to send a message to a wireless device using Short Message Service (SMS) messaging. SMS messaging was introduced in the first phase of GSM during 1991 as a simple store-and-forward text message system. Using SMS messaging, a user can use a computer or a wireless phone to compose a text message and send it to a wireless device. SMS messaging has enjoyed steady growth and it is estimated that a total of 360 billion messages were sent in the year 2002.

Despite the popularity of text messaging, SMS messaging growth in the United States has been somewhat slower compared to growth in Europe. The difference in growth can be attributed to the technology limitations of SMS messaging on wireless devices. Users composing a text message, or a reply, on a mobile device must use a somewhat awkward Man Machine Interface (MMI) which requires users to press multiple keys or buttons (multi-tapping) on the wireless device for each letter. For example, to type the letter "s", a user needs to press the number 7 key on the device 4 times (i.e. PQRS).

Text on nine keys (T9®) was then developed as a faster alternative to multi-tapping. It enables users to type letters with a single key tap per letter and then uses predictive software to guess the word the user intended to type. However, many users find predictive text entry somewhat frustrating when the software guesses the incorrect word and still tedious as each letter still requires a single key tap. Furthermore, both the SMS messaging and T9® required numerous presses of keys or buttons. The user may be required to press keys or buttons over 100 times with SMS messaging and over 300 times using T9®.

Another technology that enables the delivery of data to wireless devices is Wireless Application Protocol (WAP). WAP is a global specification and open standard that enables wireless device users to interact and access services and information. WAP is both a communications protocol and application environment that can be built on numerous operating systems and provides interoperability between different device families. WAP is used by a variety of devices including mobile phones, mobile pagers, two-way radios, smartphones and communicators. WAP is designed to work with multiple wireless networks such as CDPD, CDMA, GSM, PDC, PHS, TDMA, FLEX, ReFLEX, iDEN, TETRA, DECT, DataTAC, Mobitex and GPRS.

One of the recent technology advances with WAP is the development of the WAP Push. A push can be a WAP browser session that appears on the screen of a mobile device without an explicit request from the user at the time the session is initiated. In the normal client/server model, a client requests a service or information from a server, which responds by providing the information to the client. This is known as "pull" technology, i.e. the client pulls the information from the server. An example of pull technology is the Internet, a user enters a URL which is sent to a server and the server responds by sending a web page to the user. Although WAP Push is also based on the client/server model, it provides the means to initiate a WAP application session on the user's device without an explicit request from the user.

With WAP Push, a user can receive a pushed message and can immediately respond to the message by pressing a key. For example, a user can subscribe to a service which will cause a pushed message to be sent to the user's wireless device for predetermined events and times. At predetermined times during the day, a stock quote can be pushed to the user's wireless device giving the user the option to purchase stock by selecting a buy button. WAP Push, however, does not provide for a sender composing an interactive message by filling in a template with a question with a recipient responding by selecting at least one answer corresponding to a pre-assigned response key. Furthermore, WAP Push does not provide for brokering an event among multiple parties.

SUMMARY OF THE INVENTION

It is an object of the present invention to compose an interactive message by filling in a template and pushing the interactive message to a wireless device user.

It is another object of the present invention to package complex data and messages into a format for wireless devices wherein the user can easily respond by selecting at least one pre-assigned response key.

It is yet another object of the present invention to broker an event among multiple parties by sending out an invitation and re-sending the invitation after user indicated pause intervals until all parties are available.

It is yet another object of the present invention for an application server to manage an interactive workflow and collaboration between users, including both a sender and a recipient.

It is yet another object of the present invention to send data and messages to multiple users and summarize the responses received from all users.

It is yet another object of the present invention to maintain profile settings for each user, the settings include filtering, blocking, prioritization and level of intrusion.

It is yet another object of the present invention to provide a web services framework allowing third party applications to access the application framework.

It is yet another object of the present invention to provide verification to an interactive message by assigning and storage of a time and date stamp to record the time of the transaction, assigning and storing of an electronic signature to verify the identity of the respondent and assigning and storing a hash code to verify the content of the message.

In the present invention, an application framework is used to integrate data systems to wireless devices. A web services platform, located on the application framework, shares business logic, data and process through a programmatic interface across a network amongst core services. Core services are comprised of data services, messaging services, brokering services and learning services. The core services are utilized by users to send interactive messages to other users.

The interactive messaging system of the present invention provides for an interactive communication process between users, both senders and recipients. The sender composes a message by filling in a template stored in data services. Once completed, the sender pushes the message to a recipient's wireless device if the wireless device contains a WAP browser which is capable of receiving pushed messages. Typically the message includes a question along with answers for the recipient to choose from. Each answer corresponds with a pre-assigned response key and the recipient answers the question by selecting one of the pre-assigned response keys. The recipient's response is available to the sender in the form of an e-mail, WAP Push, on-line access or interactive message that is shown to the sender on an on-line status screen.

The interactive messaging system of the present invention can be utilized in many ways including to propose a question to a recipient and receive the recipient's response, to broker an event such as a call, a conference call a game, etc., as an interactive learning tool, as an interactive reminder and to receive approval for a specified event or purchasing of an item.

The foregoing, together with other features and advantages of the present invention, will become more apparent when referring to the following specification, claims and accompanying drawings.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

Figure 1A:
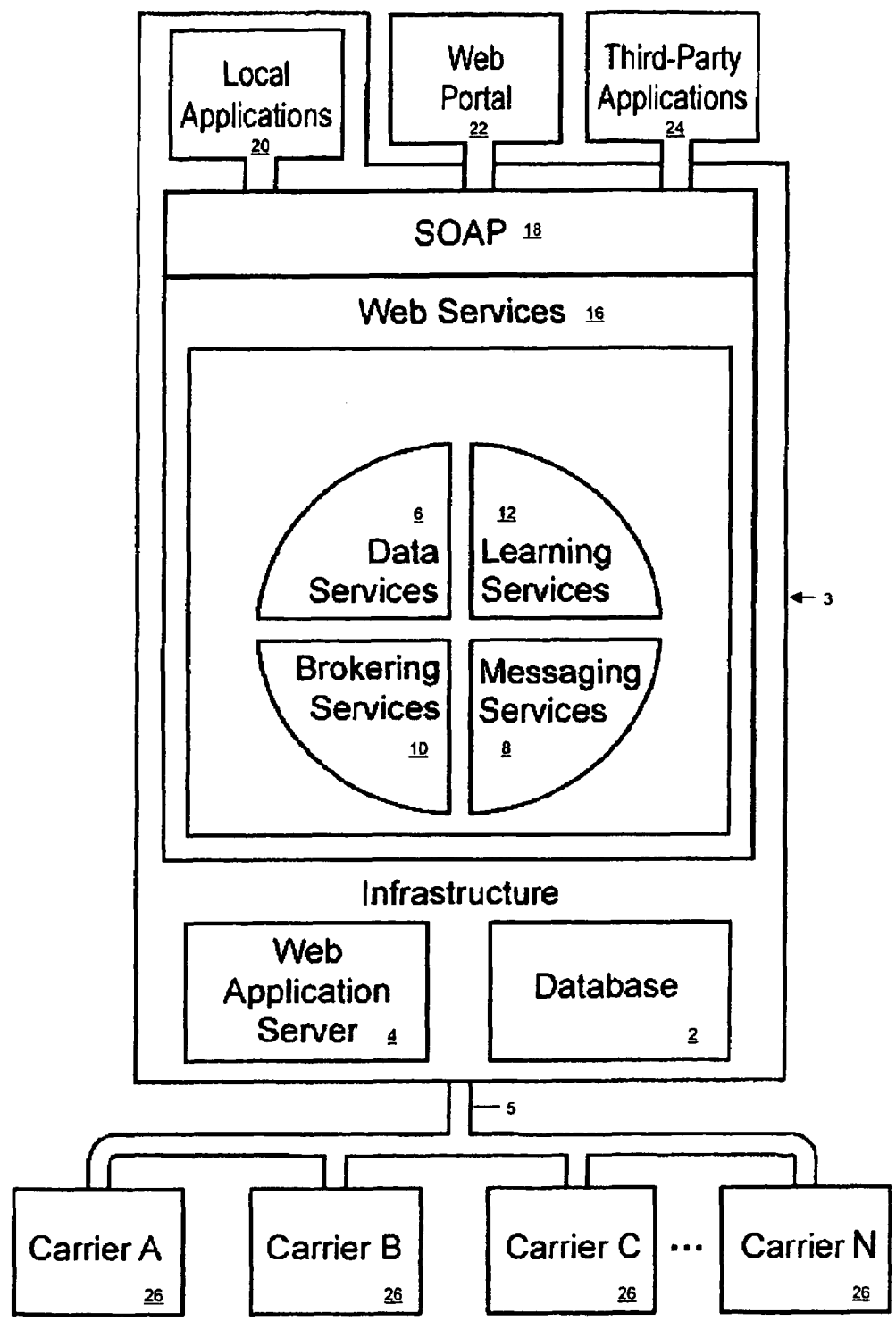
FIG. 1a illustrates an application framework showing core services.

FIG. 1 illustrates an application framework 3 of the present invention for allowing communication with wireless device users, both senders and recipients, by sending or pushing interactive messages to the wireless devices. Messages are composed by filling in a pre-formed template and the application framework 3 pushes the messages to carriers A-N 26, which are connected to the framework 3 via a network connection 5, the messages are then sent to wireless devices. Although four carriers are shown, additional carriers may to connected to the framework 3. A messaging protocol on the application framework 3 allows both local applications and outside or third party applications to talk to core services. Core services, located on the application framework, facilitate the delivery of messages by providing essential details and information that the framework uses to send or push the messages to wireless devices. In the preferred embodiment, the core services are comprised of data services 6, messaging services 8, brokering services 10 and learning services 12, although additional services may be defined and utilized. The core services are exposed via web services 16.

The learning services 12 are used to facilitate learning by sending or pushing study material, such as in the form of multiple choice questions, to recipients, such as students. For example, vocabulary questions can be sent to the recipient when studying for the SAT®. A word with four possible definitions can be pushed to the student's wireless device. The learning services 12 accomplishes this by managing a process for the user learning new information including concept presentation, pre-testing, mastery drilling, final testing and follow up review. Furthermore, learning services 12 allows external applications and third parties to add data or additional learning curriculum to learning modules stored in the learning services 12. Learning services also reports on learning status by user and by curriculum module. Additionally, learning services can also present curriculum to users in a game context wherein players compete on response time and accuracy.

The data services 6 stores information, including profiles of the users, which determine if and when the interactive message is to be sent to the recipient. Information stored within the profiles can include an access control list that filters or blocks specific senders, photographs and sounds which may be included in the message and a do not disturb window specifying when the recipient does not want to be disturbed with an interactive message. Additional information in the profiles can include a priority profile where the user can specify the level of intrusion for receiving the interactive message by the sender (i.e. do not interrupt if on a call) and also stores ID and password information, frequently used response lists to be included in the message, a list of birthdays and anniversaries of friends and family and other holidays. Other information, such as pending messages and system information is stored in data services. Furthermore, the data services 6 can store learning profiles for storing user progress across learning modules and learning module setup, learning curriculum and responses. Each user creates his profile and stores the profile on a database 2 located on the application framework 3. Other information contained in the profiles includes a list of people whose messages should be immediately sent, a picture of the user and times when a user does not want to receive a message. These profiles can be accessed through a web portal 22 allowing senders and recipients to update their profile.

The messaging services 8 pushes the interactive message to the wireless device of a recipient. Before the message can be pushed, messaging services 8 first determines if the recipient's wireless device is capable of receiving a pushed message. If the wireless device is capable of receiving the message, messaging services 8 converts the message into a format readable by the wireless device and in turn pushes the message to the wireless device. If the wireless device is not capable of receiving a pushed message, message services 8 converts the message to a short message service (SMS) message and sends as a SMS message. Furthermore, messaging services 8, if necessary, is capable of formatting the message into a format that includes multimedia capabilities such as text, sound, graphics, W.L., MIME, video or a turn based interactive game. Messaging services 8 also has the capability of providing the sender with a status of the message, i.e. if the recipient has responded and what the response is. The status of the message can be delivered to the sender with electronic data exchange, e-mail, instant messaging, on-line access (i.e. check the status via a web site) and WAP Push, including BREW® and J2ME (JAVA). The sender can set the form that the status of delivery is sent in his profile or when filling out the template to send the message.

The brokering services 10 manage the coordination of users, both senders and recipients, and the delivery of messages to wireless devices. Senders can specify a day and time for the messages to be delivered to the recipients. (Senders can include both people and devices/servers.) Recipients have the option of re-scheduling the response of messages to their wireless devices by selecting a "snooze" feature. The "snooze" feature terminates the interactive message and schedules a future time when the message will be resent to the recipient. Once this feature is selected, the brokering services 10 will resend the message at a later time such as in 10 minutes, 30 minutes, an hour or any other time specified by the recipient. Brokering services also manages the level of intrusion of the message based on recipient-maintained profile criteria via the web portal 22 with settings by originator, data type, priority and access control list. Additionally, if the interactive messaging system is being used to send invitations to invited parties or participants for an event, brokering services negotiates a time among multiple parties when all can participate in the event, such as a conference call, game, etc. Upon receiving the message, recipients have the option of indicating if they are available or hitting the snooze button. The message is resent to all participants at the end of the snooze period. The status of all invitees is shown to all participants. Brokering services manages a snooze or ready responses until all participants are ready and available.

The application framework 3 utilizes application logic to define how the business policies, rules and required services of the interactive messaging system of the present invention function. Local applications 20 store the application logic and call web services 16 using SOAP messaging 18 and instruct or trigger the construction and delivery of the interactive messages. Web services 16 shares business logic, data and process through a programmatic interface across a network amongst the core services. Since web services 16 are not tied to any one operating system or programming language, different applications from different sources communicate with each other without time consuming custom coding since all communication is in XML. As a result, web services 16 provides a platform for exposing or making accessible the core services to third party applications using software that is running on different operating systems and devices, written using different programming languages and tools from multiple vendors, all potentially developed and deployed independently. As a result, an open architecture for third parties is created. Furthermore, web services 16 enables the interactive messaging system of the present invention to be used with or without a browser.

Also located on the framework 3 is a web application server 4. The web application server 4 is comprised of software that runs on the framework 3, answers web calls from (1) a wireless device (2) via web portal 22 and (3) third parties and local applications. When answering a call, web services looks up the requested information in a database 2, databases such as Oracles® may be utilized. The database 2 is used to store data, information and rules for pushing the interactive messages to a wireless device. Specifically, stored within the database are user preferences, photographs, sounds, drop down menus, learning curriculum, birthday/anniversary lists and other holidays. Upon receiving a call, the web application server 4 retrieves the information in the database 2 via data services 6.

The application framework 3 discussed with reference to FIG. 1a enables users to send various types of interactive messages. The various types of messages include scheduling a meeting, sending a reminder, initiating a multi-player game on a wireless device and interactive learning. These and other embodiments are discussed below.

Figure 1B:
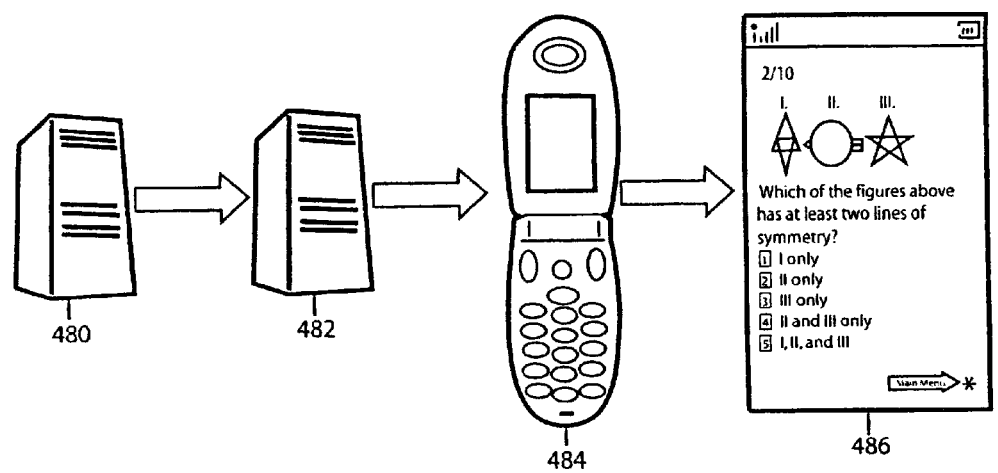
FIG. 1b illustrates a web application server sending information to a mobile access gateway utilizing BREW® technology.

In addition to utilizing WAP push technology, the present invention can also utilize application-directed SMS messaging within BREW® or JAVA technologies. BREW® and JAVA are other technologies analogous to WAP push allowing non-solicited messages to be sent to users. BREW® and JAVA wake-up using SMS provides the same ability to push messages to users, as does WAP push. In WAP push, a SMS message containing a URL address is sent to the user. Upon receiving the SMS message, the device loads the web page, which contains interactive response messages. With BREW® and JAVA, an application is pre-loaded on a wireless device. An application directed SMS message "wakes up" the application on the phone providing interactive response options. FIG. 1b illustrates web application server 480 sending information to a mobile access gateway 482, which sends the information to a wireless device 484, which displays the information on a display screen of the wireless device 486. Although FIG. 1b illustrates a question from the learning curriculum being displayed, this is by way of example only and any information can be pushed to the wireless device.

Figure 2:
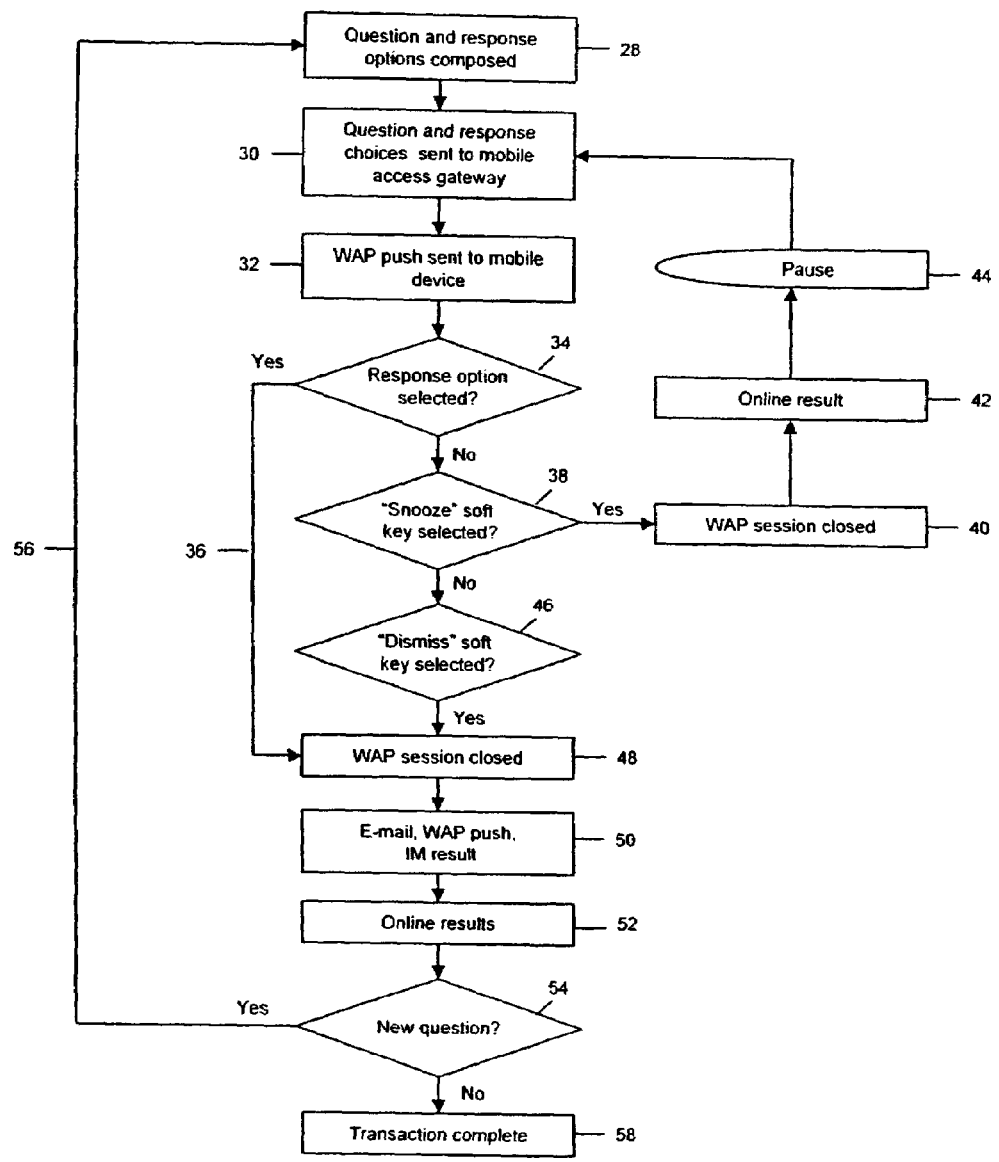
FIG. 2 illustrates a work flow diagram of a method of the present invention for pushing an interactive message to a wireless device.

FIG. 2 illustrates a flow diagram of a method of the present invention for pushing interactive messages to a wireless device. In preparing and pushing an interactive message to a recipient's wireless device, a sender composes questions and responses on a pre-formed template 28. The template, located in the data services 6 of the framework 3, is typically accessed by the sender by using a computer connected to the internet. Once the message has been composed, the interactive message is sent to a mobile access gateway 30. Upon receiving the interactive message, the mobile access gateway pushes the interactive message to the recipient's wireless device 32. The recipient's wireless device receives the interactive message and a browser session is started by a session initiation application (SIA). The SIA displays a screen with the question and response options composed by the sender.

Once the question and responses appear on the screen of the recipient's wireless device, the recipient may select a response corresponding to a pre-assigned response key 34. Furthermore, the recipient may select a snooze message key which closes the interactive messaging system 40 and causes a pre-defined delay to occur before the interactive message is again pushed to the recipient's wireless device. The status of the recipient's response, i.e. selecting the snooze key, is shown to the sender on an on-line status screen or any other method, such as e-mail defined in the template. The interactive message is then paused for the length of time specified by the snooze key 44. After this specified time period is over, the question and responses are resent by the mobile access gateway and steps 30, 32 and 34 are repeated.

The recipient can also choose to cancel the interactive messaging session by selecting a pre-assigned response key corresponding to a dismiss feature 46. By dismissing the interactive message, the message will not be resent to the recipient and the interactive messaging session is closed 48. The result or status of this session, i.e. the session is closed, is sent back to the sender in the form of an e-mail, WAP Push, on-line access or interactive message 50 that is shown to the sender or an on-line status screen 52.

If the recipient chooses to respond to the interactive message 36, the response is made available to the sender via an e-mail and on-line. Furthermore, the interactive messaging session will be closed 48 as mentioned previously. The result of the interactive messaging session, i.e. the selected response, is sent to the sender 50 in the form of an e-mail, WAP Push, on-line access or interactive message that is shown to the sender on an on-line status screen 52. After the recipient has selected a pre-assigned response key, the sender, based upon the response, may compose a new message with a new question and response choices that are sent to the recipient to clarify or follow-up on the response 54. If the sender chooses to push a new message to the recipient 56, the whole process is repeated starting with step 28. If the sender chooses not to push a new message to the recipient the transaction has been completed and the interactive messaging session is closed 58.

Figure 3A:
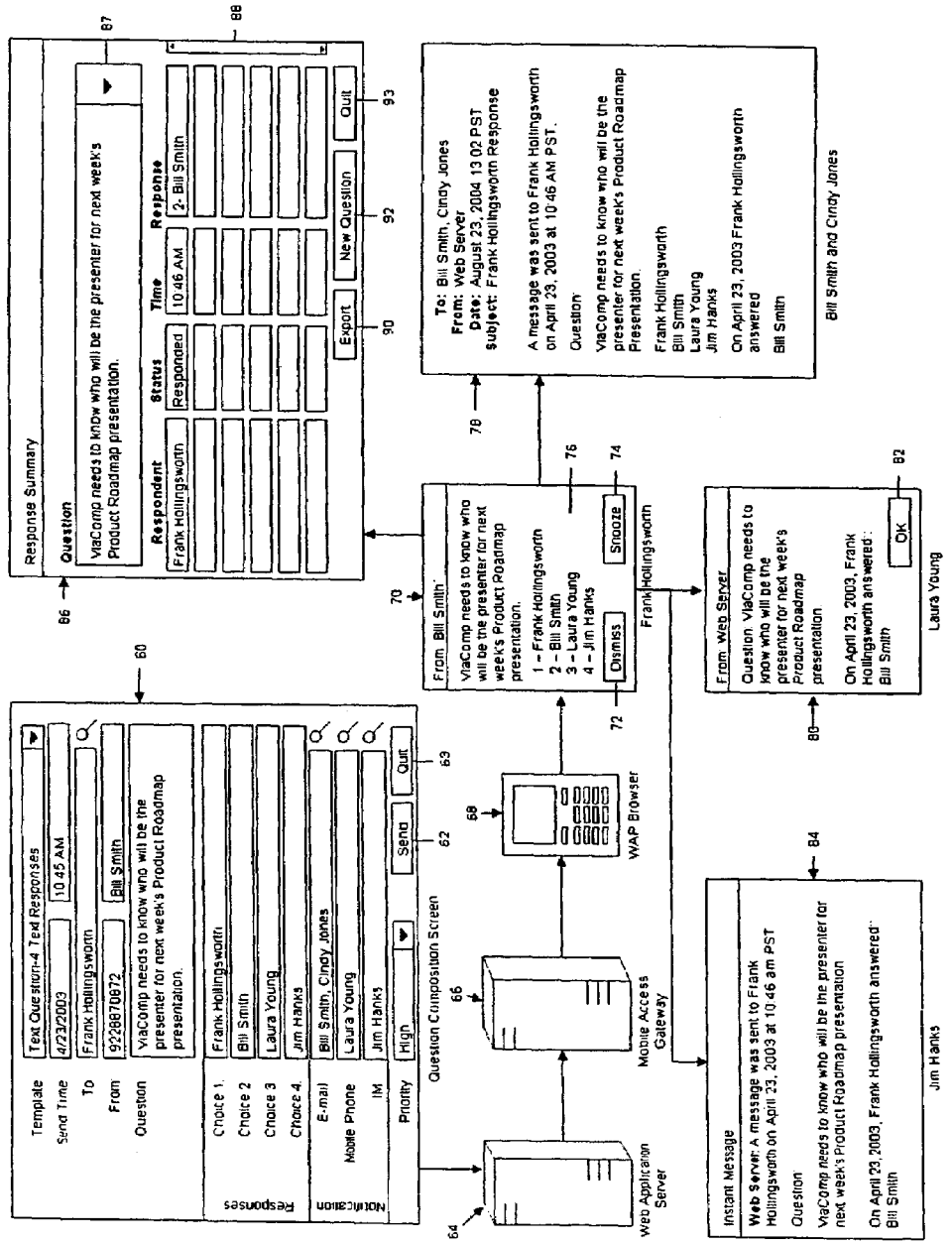
FIG. 3a illustrates a method of pushing an interactive message to a wireless device.

FIG. 3a illustrates a method of pushing an interactive message to the wireless device of a recipient. A template 60 is utilized by a sender to compose the interactive message, including the question and responses, that will be pushed to a recipient's wireless device. A computer connected to the Internet or a wireless device can be used to access the template. Several fields are included on the template, including drop down menus from which the sender can select from a variety elements to be included in the message. Elements can include the type of template and the priority of the message to be sent. Other fields to be filled in by the sender can include the recipient of the message, the sender of the message, the question included in the message, several responses corresponding to pre-assigned response keys for the recipient to choose from, the method of notification of the response to selected individuals and the priority of the message. In the preferred embodiment, a send time default is immediate, however, a sender can schedule to have the message sent at a specific data and time in the future.

Templates can vary, such as requiring a varying amount of response options to be entered (i.e. 4 response options, 6 response options, etc.) as well as the type of data used for the question and response options. The question and response options can be a graphic image, a sound, animation, WML, MIME, a video clip or a turn based interactive game. The priority option allows the sender to indicate the priority and specify the level of intrusiveness for the message to be delivered. For example, do not interrupt the recipient if he is on the phone.

If the sender chooses to cancel the interactive messaging session prior to sending the message, the sender selects a quit button 63 located on the template 60. However, if the sender chooses to send the message, the sender selects a send button 62 located on the template 60 after the template 60 has been filled in. After selecting the send button 62, the interactive message is sent to a web application server 64 which immediately sends the message to a mobile access gateway 66 or holds the message to be sent in the future time and date specified by the sender in the template. The mobile access gateway 66 is a server in the carrier's network that allows messages to be transformed into a WAP Push over the carrier's network to the recipient's wireless device, if the recipient's wireless device contains a WAP browser 68. If the recipient's wireless device does not contain a WAP browser 68 or the WAP browser 68 does not have the capability of receiving pushed messages, the message is sent to the wireless device in the form of a SMS message.

Once the message is pushed to the recipient's wireless device, a browser session is started by the Session Initiation Application (SIA) which displays a screen 70 with the question and response options corresponding to pre-assigned response keys. The sender has the option of selecting one of the pre-assigned response keys in response to the question, selecting the dismiss button 72 or selecting the snooze button 74. If the recipient selects one of the pre-assigned response keys 76, the interactive messaging session is completed and the browser session is closed. Selecting the dismiss button 72 cancels the interactive messaging session and selecting the snooze button 74 temporarily terminates the interactive message and schedules the message to be resent at a later time.

Once the recipient has selected a response, notification of the response selected is sent via e-mail, WAP Push, instant messaging or on-line access as specified in the template 60. The notification can show the question, the response options, the response selected and the date the selection was made. As specified in the template 60, notification of the selected response can be sent to at least one third party in addition to the sender of the message. As shown in FIG. 3, third party notification can be automatically sent in the form of an e-mail 78, a message pushed to a wireless device 80 or an instant message 84 as specified in the template. When the notification is pushed to a wireless device 80, the interactive messaging system can be cancelled by selecting an OK button 82. The sender can also receive the recipient's response by accessing the status of the message on-line 86. On-line notification or status illustrates the question sent by the sender, a drop down box 87 allows the sender to select previous questions sent as well as the responses received. The on-line status 86 also illustrates a summarization table 88 showing status, time and response by user. This table is useful in summarizing results from multiple respondents. An export button 90 can be selected for exporting into a comma delimited text file so that it can be imported into a spreadsheet for further analysis. Selecting a new question button 92 allows the sender to access the original template to compose or edit a new question to follow up or clarify the question based on the recipient's response.

An example of an interactive message is shown in FIG. 3a. A sender, Bill Smith, composes a message to Frank Hollingsworth by filling in a template with a question, four possible responses and the names of those to receive the response. The question, who will be the presenter for a presentation, is pushed to Frank along with the four possible answers to the question. Upon receiving this message, Frank selects the presenter by selecting a pre-assigned response key corresponding to name of the presenter. Once selected, a status is sent to all people identified in the template to receive the response. The interactive message of the present invention can also be used to confirm appointments, such as a doctor's appointment, a dentist appointment, a hair appointment, etc. Furthermore, a message can be pushed to a recipient asking if the recipient can still make the appointment. The recipient responds to the question by either selecting a "yes" key or a "no" key. If the recipient is unable to make the appointment, that time can be allocated to another person. Interactive messaging can also be used for opinion surveys and by schools to send information to parents about their children.

To provide additional security, non-repudiation and authentication to the template-based secure messaging architecture of the present invention, a post mark such, as the United States Postal Service Electronic Postmark (USPS® EPM) can be utilized. The electronic authentication is a Web based security service that enables users to verify authenticity, provide tamper detection and date and time stamp to electronic messages. Evidence of content authenticity can be stored in a repository to ensure trusted non-repudiation of content. Additionally, the electronic authentication provides a tracking number whereby all parties involved in an electronic transaction can access the transaction record on the authentication server and verify the electronic signature, time stamp and content. The electronic authentication enables transactions to comply with the ESIGN legislation, enacted in June 2000, which made electronic signatures a legally viable option for conducting business.

Figure 3B:
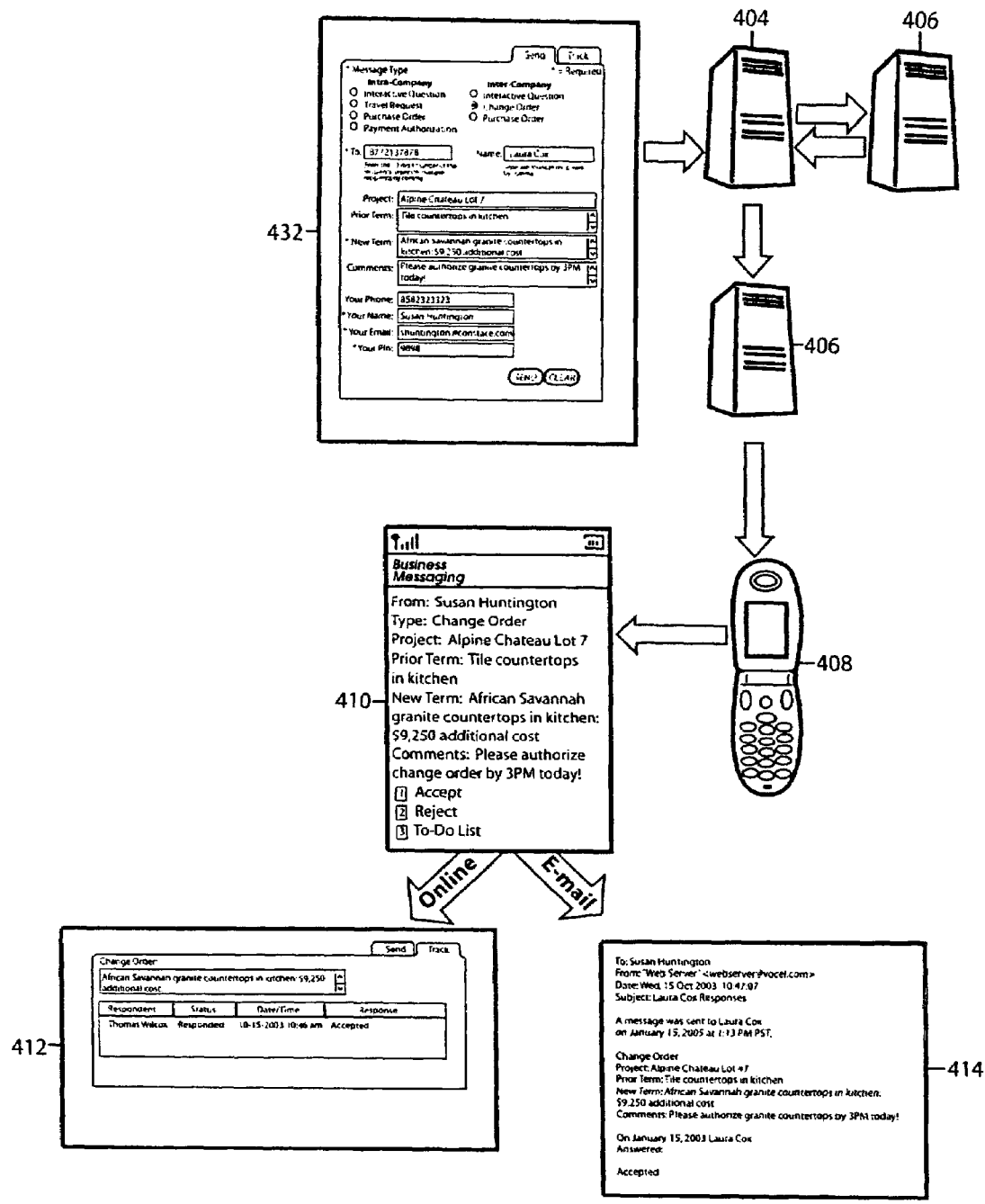
FIG. 3b illustrates an example of an interactive based system of the present invention utilizing electronic authentication.

FIG. 3b illustrates an example of an interactive template based system of the present invention utilizing the electronic authentication. First, a user or sender selects one of many pre-defined templates to send a message to a recipient. In the example illustrated in FIG. 3b, a template 400 designed for a company for sending a message to a recipient is illustrated. The sender fills in the template 400 by selecting the message type, enters the name and telephone number of the recipient, the name of the project, the prior terms of the project, the new terms of the project to be approved by the recipient, any comments the sender has and the name, telephone number and email of the sender. Once this information has been entered into the template, the sender selects a send button 402 (or the clear button 403 to clear the template) and the message is sent to a web application server 404 that sends the message to an authentication server 406 and assigns a date and time stamp to the message. After a date and time stamp has been assigned to the message, the message is sent back to the Web application server 404, which then immediately sends the message to a mobile access gateway 406. The mobile access gateway 406 is a server in the carrier's network that allows messages to be transformed into a WAP Push, including BREW® and JAVA, over the carrier's network to the recipient's wireless device 408.

Once the message is pushed to the recipient's wireless device, a user session is started which displays a screen 410 with information provided by the sender and response options corresponding to pre-assigned response keys. In the example illustrated in FIG. 3b, the pre-assigned response keys are (1) accept, (2) reject, or (3) to-do list. Selecting the accept key authorizes the change order, selecting the reject key rejects the change order and selecting the to-do list which places the request on hold until the recipient makes a decision. Once the recipient has selected a pre-assigned response key, notification of the response selected is sent to the sender on-line 412 or via email 414.

Figure 4:
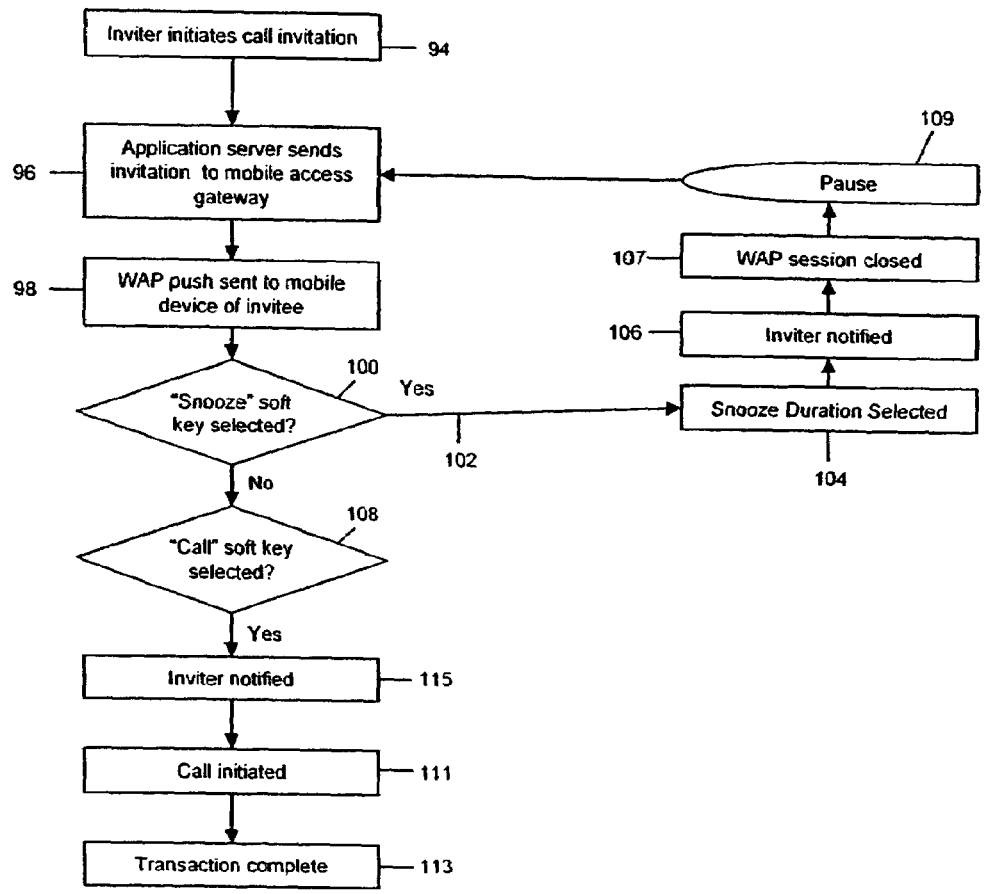
FIG. 4 illustrates a work flow diagram for an interactive call invitation method of the present invention.

FIG. 4 illustrates a work flow diagram for an interactive call invitation method of the present invention. In the interactive call invitation method, a sender uses a WAP browser, a computer connected to the Internet or a JAVA application located on a wireless device to compose an invitation by filling in a template 94. In the template, the sender fills in the name or names of the recipients of the invitation or the invitees, the topic of the call and the priority of the call. Alternatively, the sender can fill in the phone number of number of the invitees instead of their names. Once the invitation has been composed, the invitation is sent to an application server as described with reference to FIG. 2. Upon receipt of the invitation, the application server sends the invitation to the mobile access gateway 96 which immediately sends the invitation to an invitee's wireless device or holds the invitation until a specified time and date indicated in the template. If the invitee's wireless device has a WAP browser the invitation is pushed to the invitee's wireless device 98. However, if the invitee's wireless device does not contain a WAP browser or the WAP browser does not have the capability of receiving pushed messages, the invitation is sent to the invitee's wireless devices in the form of a SMS message.

When the invitee receives the invitation, the invitee has the option of selecting a snooze button 100 or a call button 108. If the snooze button is selected 102, the invitee has the option of selecting the duration of the pause or delay 104 before the invitation is resent to the invitee or to dismiss the invitation and close the messaging session. If the snooze button is selected, the sender is notified 106 that the invitee has delayed responding to the invitation as well as the length of the delay. Furthermore, the interactive session is closed 107 until the length of the delay 109 has been completed and the invitation is resent, repeating steps 96 and 98. If the call button is selected, the invitee has accepted the invitation, the invitee's wireless device automatically auto dials the sender 111 and the interactive session is completed 113. Although sending the invitation to only one invitee has been described, the interactive call invitation method can be used to invite more than one invitee. Brokering services manages the responses from all invitees until all invitees are either ready to participate in the call or have selected the dismiss key.

Figure 5:
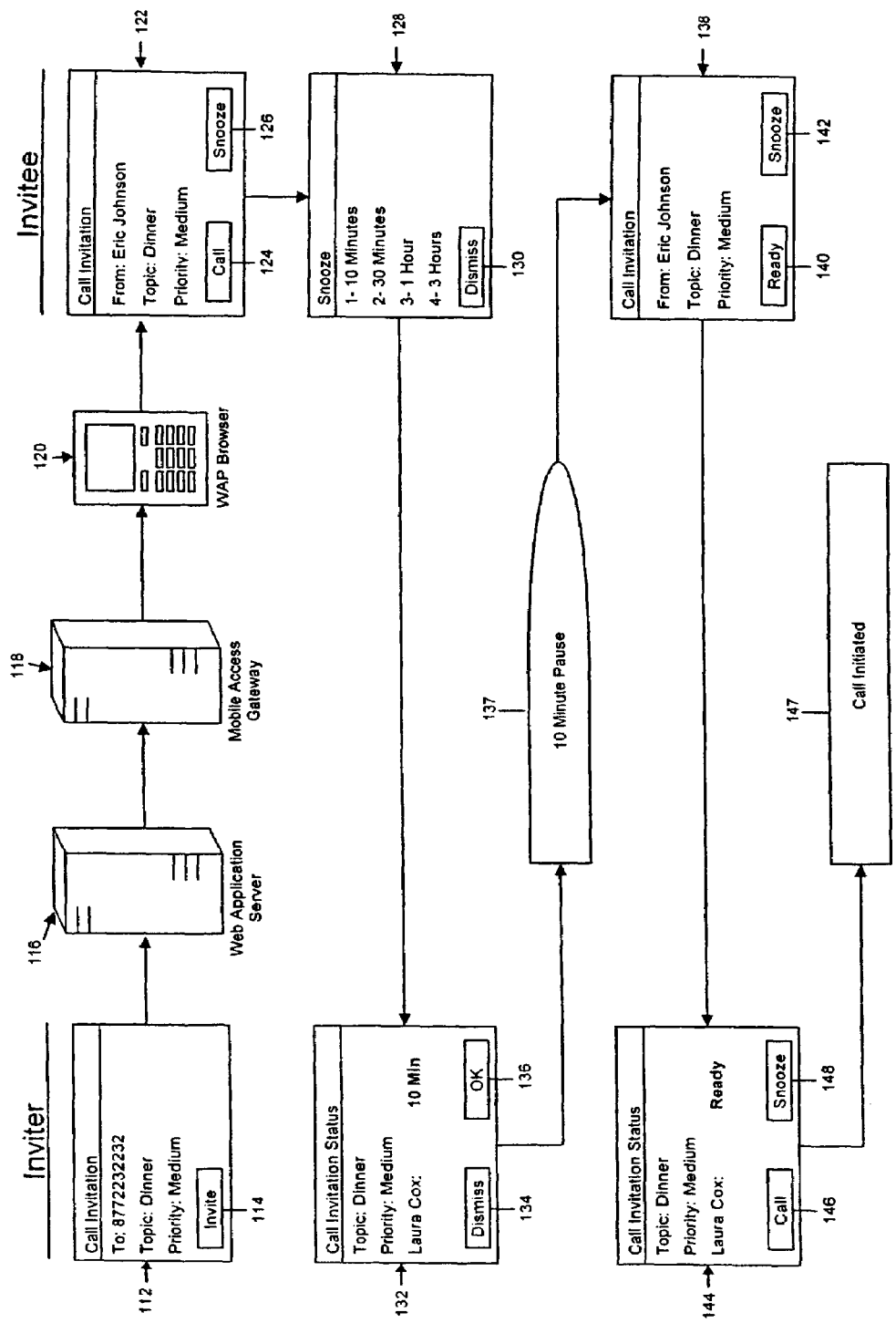
FIG. 5 illustrates an example of the interactive call invitation method of the present invention.

FIG. 5 illustrates an example of the interactive call invitation method as described with reference to FIG. 4. In this method, a sender fills in a template 112 to invite the recipient or invitee to participate in a telephone call. The sender enters the name or telephone number of the invitee, the topic to be discussed in the call and the priority of the message. The invitee can be entered manually or selected from the sender's address or phone book. Once this information has been filled in, the sender selects an invite button 114 and the invitation is sent to the recipients as a WAP Push message or a SMS message if the invitee's wireless device does not contain a WAP browser or the WAP browser does not have the capability of receiving pushed messages. As described with reference to FIG. 4, the invitation can be sent to more than one invitee.

After selecting the invite button 114, the invitation is sent to a web application server 116, which immediately sends the message to a mobile access gateway 118 or holds the message to be sent in a future time and date specified by the sender. The mobile access gateway verifies that the invitee's wireless device has a WAP browser 120 and pushes the invitation to the invitee's wireless device. If the invitee's wireless device does not contain a WAP browser 120 or the WAP browser 120 does not have the capability of receiving pushed messages, the invitation is sent to the wireless device in the form of a SMS message. Once sent to the invitee's wireless device, a browser session is initiated by the Session Initiation Application (SIA) and displays a screen showing the invitation 122. Upon receipt of the invitation, the invitee has the option of selecting a call button 124 or a snooze button 126. If the invitee selects the call button 124, the invitee's wireless device automatically dials the sender. If the invitee does not want to talk to the sender at the present moment, or does not want to talk to the sender at any time, the invitee selects the snooze button 126.

Upon selecting the snooze button 126, a display screen 128 with several pre-assigned response keys and a dismiss button 130 are displayed on the invitee's wireless device. Selecting the dismiss button 130 closes the interactive session and the invitee will not receive the invitation again. The pre-assigned response keys correspond to the length of snooze or delay before the message is resent to the recipient. Selecting one of the pre-assigned response keys will terminate or pause the interactive session for a period of time that the invitee selected. When an invitee selects the snooze button 126 and selects the length of pause, a status screen 132 is sent to the sender indicating that the invitee has selected the snooze button 126 and the length pause that the invitee has selected. Upon receiving this screen, the sender can select a dismiss key 134 and close the interactive session or select an OK button 136 accepting the invitee's delay and the pause selected by the invitee occurs 137.

After the length of pause selected by the invitee, a display screen showing the invitation 138 is pushed to the invitee's wireless device. The invitee now has the option of selecting a ready button 140 or another snooze button 142. If the invitee still does not want to talk to the sender at the present moment, the invitee selects the snooze button 142 and the process as described with reference to screen 128 is repeated. If the recipient selects the ready button 140, a display screen 144 is sent or pushed to the sender advising the sender that the recipient is available to talk. Upon receiving this screen 144, the sender can select a snooze key 148 and the process as described with reference to screen 128 is repeated or the sender can select a call button 146 and the sender's wireless device automatically dials the invitee initiating the call 147.

An example of an interactive message is shown in FIG. 5. Eric Johnson pushes a message to Laura Cox inviting her to dinner. Laura communicates with Eric as to a best time to talk to finalize dinner plans. Furthermore, this interactive message can be utilized to schedule calls to take place in the future where messages are pushed to all parties at the time of the call to determine if it is a good time to talk. If any party selects snooze, all parties are reminded of the call at a later time until both parties indicate they are available and the event can take place.

Figure 6:
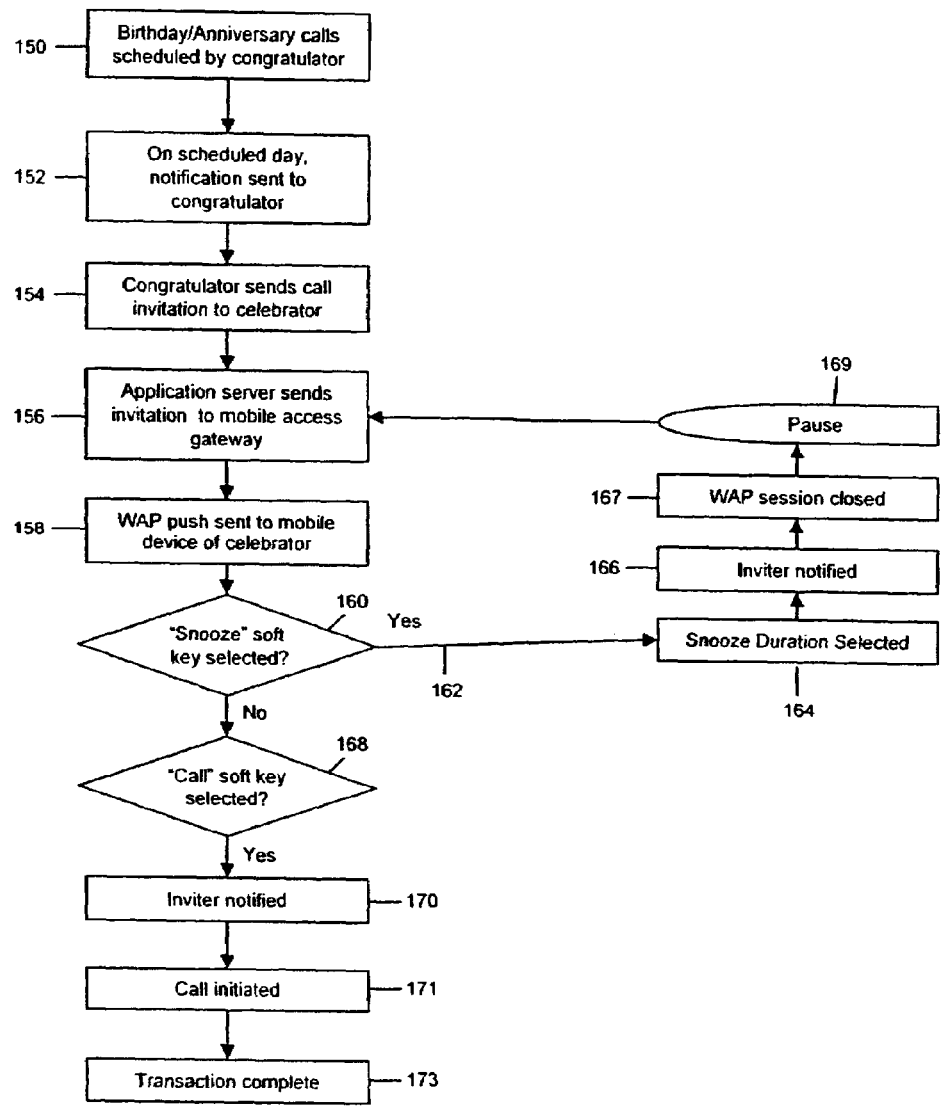
FIG. 6 illustrates a work flow diagram for an interactive birthday or holiday reminder of the present invention.

The interactive messaging system can also be used for sending interactive reminders at pre-defined times. FIG. 6 illustrates a work flow diagram for an interactive birthday reminder of the present invention. In the interactive birthday reminder method, a sender or congratulator schedules a birthday reminder to be sent to their wireless device by using a computer connected to the Internet or by using a wireless device to fill in a template 150. In the template, the congratulator enters the name of the person having a birthday (celebrator) and the date and time that the reminder will be pushed to the congratulator's wireless device. Once the template has been completed, the reminder is stored in the application server until the scheduled time for delivery.

On the scheduled day and time, the application server pushes the reminder to the congratulator's wireless device 152. Upon receiving the reminder, the congratulator can send an invitation using a WAP browser, as described with reference to FIGS. 4 and 5, to the celebrator. If the congratulator sends an invitation to the celebrator, the application server sends the invitation to the mobile access gateway 156. If the celebrator's wireless device has a WAP browser the invitation is pushed to the celebrator's wireless device 158. However, if the celebrator's wireless device does not contain a WAP browser or the WAP browser does not have the capability of receiving pushed messages, the invitation is sent to the celebrator's wireless devices in the form of a SMS message.

When the celebrator receives the invitation, the celebrator has the option of selecting a snooze button 160 or a call button 168. If the snooze button is selected 162, the celebrator has the option of selecting the duration of the pause or delay 164 before the invitation is resent to the celebrator or to dismiss the invitation and close the messaging session. If the snooze button is selected, the congratulator is notified 166 that the celebrator has delayed responding to the invitation as well as the length of the delay. Furthermore, the interactive session is closed 167 until the length of the delay 169 has been completed. After the delay is over, the invitation is resent and steps 150-160 are repeated. If the call button 168 is selected, the celebrator has accepted the invitation, the congratulator is notified 170, the celebrator's wireless device automatically dials the sender 171 and the interactive session is completed 173. Although an interactive birthday reminder has been illustrated, the interactive birthday reminder of the present invention can also be utilized for additional holidays such as Mother's Day, Father's Day, Valentine's Day and Christmas.

Figure 7:
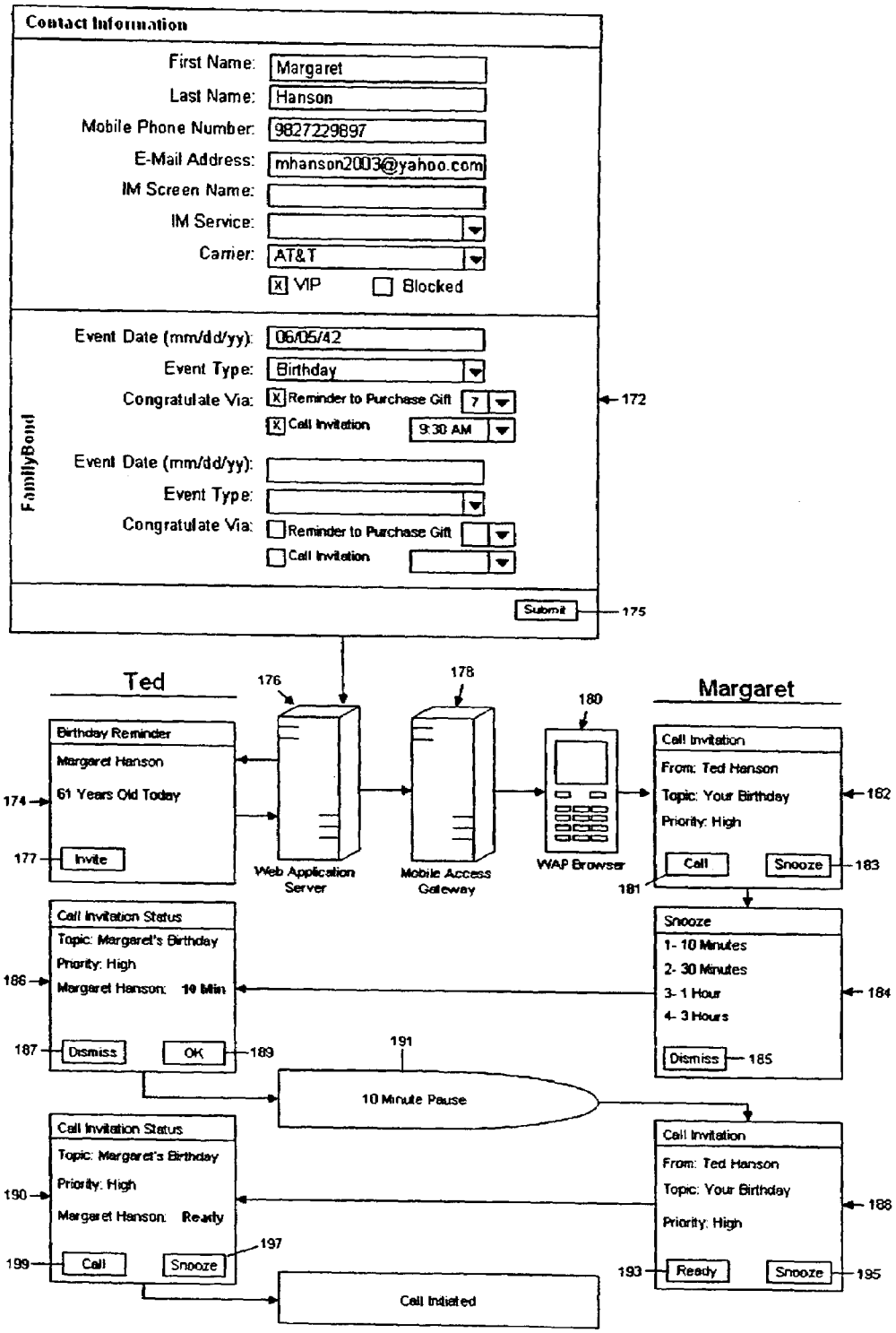
FIG. 7 illustrates an example of the interactive birthday or holiday reminder of the present invention.

FIG. 7 illustrates an example of the interactive birthday reminder or reminders of other holidays of the present invention. In this method, a congratulator fills in a template 172 to set up reminders and reminder types for acquaintances. This template can be accessed on a computer connected to the Internet or on a wireless device. The congratulator can enter information about the celebrator such as his name, his phone number and wireless device carrier. Furthermore, the congratulator enters the day and time to push the reminder of the event (such as a birthday) to the congratulator's wireless device, whether to remind the congratulator to buy a gift and whether to initiate an interactive call invitation as described previously with reference to FIG. 5. Once this information has been filled in, the congratulator selects a submit button 175 and the reminder is sent to a web application server 176 until the scheduled time for delivery.

At the time scheduled for delivery, the reminder is sent to the congratulator's wireless device 174. The congratulator has the option of selecting an invite button 177. Selecting the invite button 177 immediately sends an invitation to a mobile access gateway 178. The mobile access gateway 178 pushes the reminder to the celebrator's wireless device. If the celebrator's wireless device does not contain a WAP browser 180 or the WAP browser 180 does not have the capability of receiving pushed messages, the message is sent to the wireless device in the form of a SMS message. Once sent to the celebrator's wireless device, a browser session is initiated by the Session Initiation Application (SIA) and a screen showing the reminder 182 is displayed on the wireless device. Upon receiving the display screen, the celebrator has the option of selecting a call button 181 or a snooze button 183. If the celebrator selects the call button 181, the celebrator's wireless device automatically dials the congratulator. If the celebrator does not want to talk to the congratulator at the present moment, or does not want to talk to the congratulator at any time, the celebrator selects the snooze button 183.

Upon selecting the snooze button 183, a display screen 184 with several pre-assigned response keys and a dismiss button 185 are displayed on the celebrator's wireless device. Selecting the dismiss button 185 closes the interactive session and the celebrator will not receive the invitation again. The pre-assigned response keys correspond to the length of snooze or delay before the invitation is resent to the celebrator. Selecting one of the pre-assigned response keys will terminate or pause the interactive session for a period of time that the celebrator selected. When a celebrator selects the snooze button 183 and selects the length of pause, a status screen 186 is sent to the congratulator indicating that the celebrator has selected the snooze button 183 and the length pause that the celebrator has selected. Upon receiving this screen 186, the congratulator can select a dismiss key 187 and close the interactive session or select an OK button 189 accepting the celebrator's delay and the pause selected by the celebrator occurs 191.

After the length of pause selected by the celebrator, a display screen showing the invitation 188 is pushed to the celebrator's wireless device. The celebrator now has the option of selecting a ready button 193 or another snooze button 195. If the celebrator still does not want to talk to the sender at the present moment, the sender selects the snooze button 195 and the process as described with reference to screen 184 is repeated. If the celebrator selects the ready button 193, a display screen 190 is sent or pushed to the congratulator advising the congratulator that the celebrator is available to talk. Upon receiving this screen 190, the congratulator can select a snooze key 197 and the process as described with reference to screen 184 is repeated or select a call button 199 and the congratulator's wireless device automatically dials the celebrator initiating the call 201.

Figure 8:
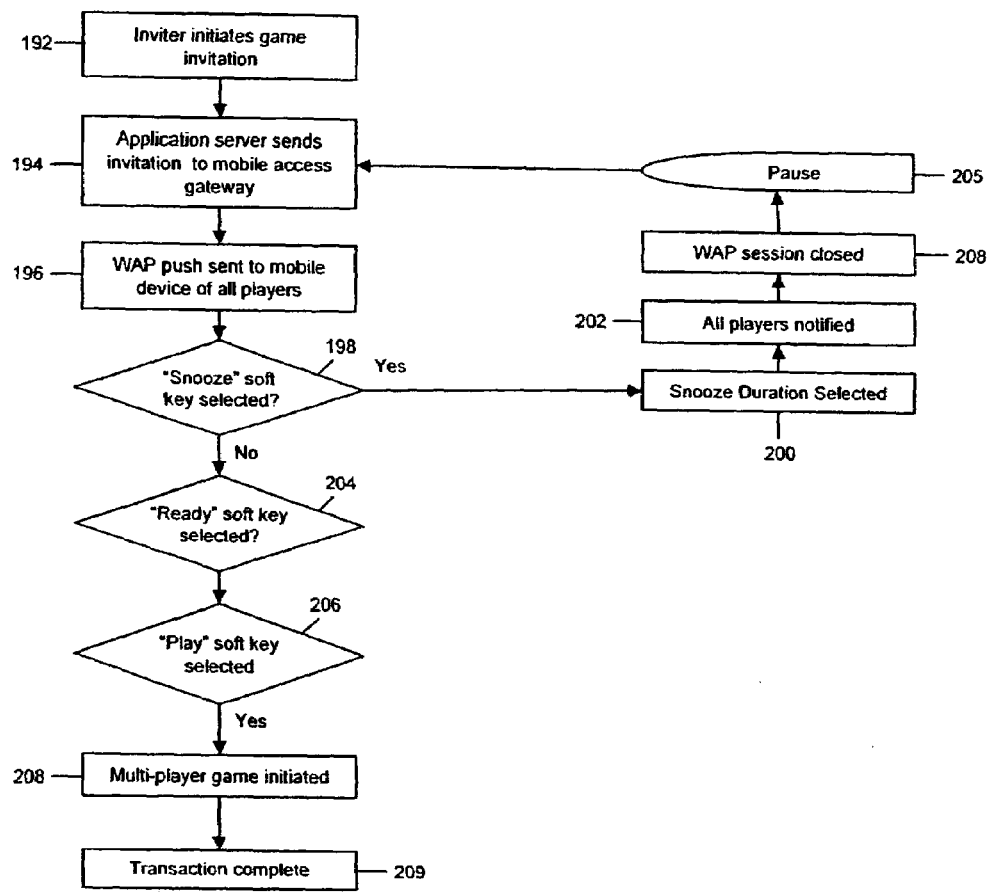
FIG. 8 illustrates a work flow diagram for an interactive multi-player game invitation method of the present invention.

The present invention can also be used for an interactive multi-player game. FIG. 8 illustrates a work flow diagram for an interactive multi-player game invitation method. In the multi-player game invitation method, a sender uses a WAP browser or a computer connected to the Internet to compose a game invitation by filling in a template 192. In the template, the sender fills in the name of the invitee, the name of the game and the desired number of people required to play the game. Once the invitation has been composed, the invitation is sent to an application server as described with reference to FIG. 2. Upon receipt of the invitation, the application server sends the invitation to the mobile access gateway 194 which immediately sends the invitation to the player via his wireless device. If the player's wireless device has a WAP browser the invitation is pushed to the player's wireless device 196. However, if the player's wireless device does not contain a WAP browser or the WAP browser does not have the capability of receiving pushed messages, the invitation is sent to the player's wireless device in the form of a SMS message.

When the player receives the invitation, the player has the option of selecting a snooze button 198 or a ready button 204. If the snooze button is selected, the player has the option of selecting the duration of the pause or delay 200 before the invitation is resent to the player or to dismiss the invitation and close the messaging session. If the snooze button is selected, the sender is notified 202 that the player has delayed responding to the invitation as well as the length of the delay. Furthermore, the interactive session is closed 203 until the length of the delay 205 has been completed and the invitation is resent. If the ready button 204 is selected, the player has accepted the invitation and now must select a play button 206. The multi-player game is initiated if the desired number of player are available 208 and the transaction is completed 209. Although sending the invitation to only one player has been described, the interactive multi-player game method can be used to invite more than one player. Brokering services manages the responses from all players until the desired number of players ready to play the game has been reached.

Figure 9:
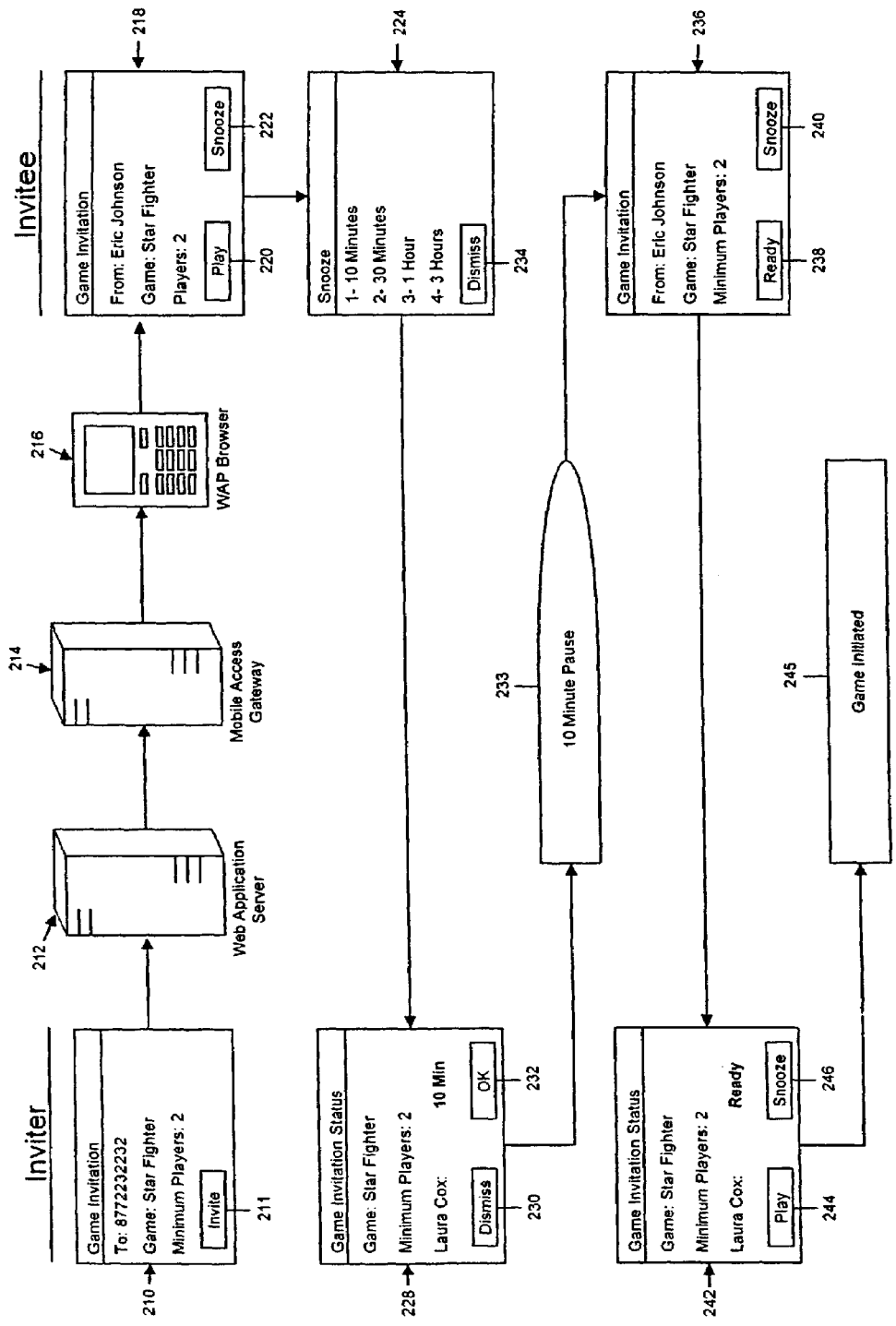
FIG. 9 illustrates an example of the interactive multi-player game invitation method of the present invention.

FIG. 9 illustrates an example of the interactive multi-player game invitation method as described with reference to FIG. 8. In this method, a sender fills in a template 210 to invite at least one player to participate in a game. The sender enters the name of the player, the name of the game and the desired number of people required to play the game. The player's name can be entered manually or selected from the sender's address or phone book. Once this information has been filled in, the sender selects an invite button 211 and the invitation is sent to the player as a WAP Push message or a SMS message if the player's wireless device does not contain a WAP browser or the WAP browser does not have the capability of receiving pushed messages.

After selecting the invite button 211, the invitation is sent to a web application server 212 which immediately sends the message to a mobile access gateway 214 or holds the message to be sent in a future time and date specified by the sender. The mobile access gateway verifies that the player's wireless device has a WAP browser 216 and pushes the invitation to the player's wireless device. If the player's wireless device does not contain a WAP browser 216 or the WAP browser 216 does not have the capability of receiving pushed messages, the message is sent to the wireless device in the form of a SMS message. Once sent to the player's wireless device, a browser session is initiated by the Session Initiation Application (SIA) and displays a screen showing the invitation 218. The player has the option of selecting a play button 220 or a snooze button 222. If the player selects the play button 220, a message is sent to the sender indicating the player is ready to play. If the player does not want to play the game at the present moment, or does not want to play the game at any time, the player selects the snooze button 222.

Upon selecting the snooze button 222, a display screen 224 with several pre-assigned response keys and a dismiss button 234 are displayed on the player's wireless device. Selecting the dismiss button 234 closes the interactive session and the player will not receive the invitation again. The pre-assigned response keys correspond to the length of snooze or delay before the invitation is resent to the player. Selecting one of the pre-assigned response keys will terminate or pause the interactive session for a period of time that the player selected. When a recipient selects the snooze button 222 and selects the length of pause, a status screen 228 is sent to the sender indicating that the player has selected the snooze button 222 and the length of pause that the player has selected. Upon receiving this screen 228, the sender can select a dismiss key 230 and close the interactive session or select an OK button 232 accepting the player's delay and the pause selected by the player occurs 233.

After the length of pause selected by the player, a display screen showing the invitation 263 is pushed to the player's wireless device. The player now has the option of selecting a ready button 238 or another snooze button 240. If the player still does not want to play the game at the present moment, the player selects the snooze button 240 and the process as described with reference to screen 224 is repeated. If the recipient selects the ready button 238, a display screen 242 is sent or pushed to the sender advising the sender that the player is available to play. Upon receiving this screen 242, the sender can select a snooze key 246 and the process as described with reference to screen 224 is repeated or select a play button 244 and the game is initiated 245.

As an example of the multi-player game invitation method is shown in FIG. 9. In this example, Eric Johnson sends an invitation to Laura Cox to play the game Star Fighter on their wireless devices. When Laura is ready to play, the game is initiated on each of their wireless devices.

Figure 10:
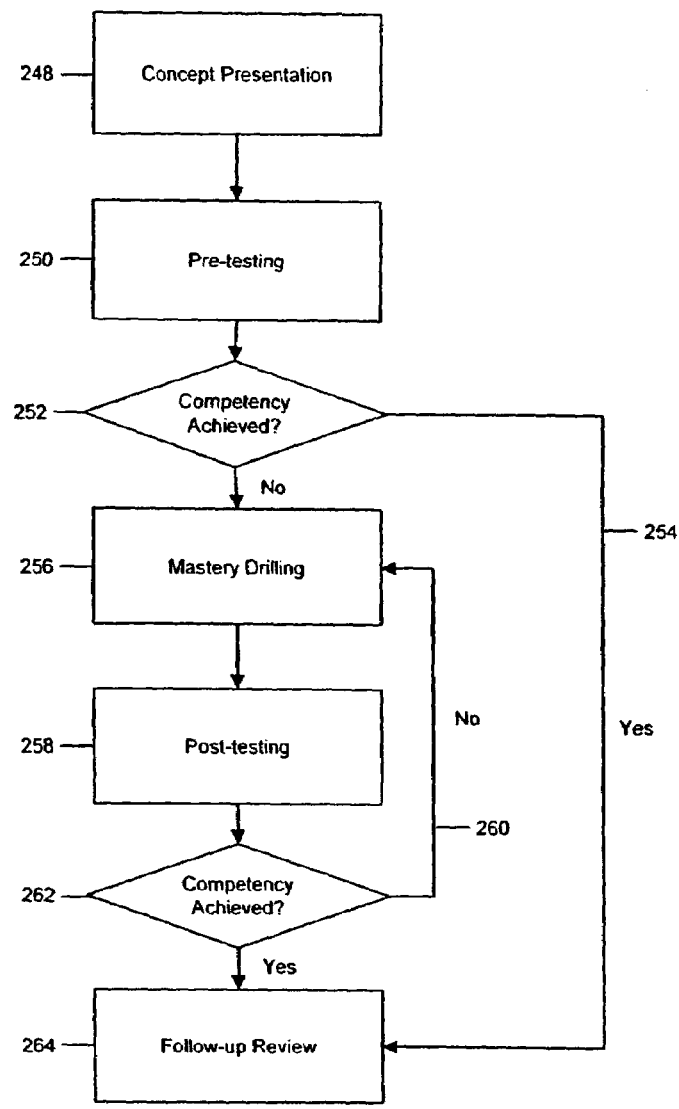
FIG. 10 illustrates the process logic used for an interactive learning method.

As described previously, the interactive messaging system of the present invention can be used as a learning tool. As illustrated in FIG. 10, the interactive learning method uses process logic which is comprised of several steps to complete the learning process. The first step in the precess logic is a concept presentation 248 step where the application server uses WAP Push to send the question and correct answer to the wireless device user to review. Afterwards, the web application server uses WAP Push to sequentially send all questions to the wireless device user to determine competency in a pre-testing step 250. Furthermore, questions that are answered incorrectly are marked by the web application server to be used in the mastery drilling step 256.

After the pre-testing is complete, the web application server determines if the specified completion has been made. For example, a 95% completion threshold could be set so that the user must answer 95% of the questions correctly to achieve competency 252. If the user has achieved competency, the application next moves to a follow up review 264. In the follow up review, questions are sent to the wireless device user for a time period specified in the system to reinforce long term retention. When the competency has not been achieved the user moves to the mastery drilling step 256. In the mastery drilling step 256, the web application server maintains a pool of questions that will be sent to the wireless device user. Questions are randomly selected from the pool and pushed to the user using WAP Push until the pool is depleted. Incorrectly answering questions during the mastery drilling phase adds additional questions to the pool. Correctly answering questions during the mastery drilling phase deletes questions from the pool. Questions that have been correctly answered during the pre-testing step initially establish the pool. For example, if the user incorrectly answered three questions during the pre-test phase, the pool would contain an initial volume of nine questions, or three instances of each question incorrectly answered during the pre-test phase.

During the mastery drilling step 256, the pool of questions increases or decreases based on the performance of the wireless device user. For example, if the pool had a beginning volume of nine questions and the user correctly answered the first question, the pool would be decreased by one resulting in a remaining volume of eight questions. However, if the mobile device user incorrectly answered the next question, three instances of the incorrectly answered question are added to the pool resulting in a new volume of ten total questions in the pool. During the mastery drilling step, the user increments or decrements the total number of questions until the pool is depleted which initiates the next step, post-testing 258. In the post-testing phase, all questions in the module are sent to the user using WAP Push. After the post-testing phase, the system determines if competency has been achieved 262 as described above. If competency has not been achieved, steps 252, 256 and 258 are repeated. If competency has been achieved, the user is sent to the follow-up review 264 as described above.

Figure 11:
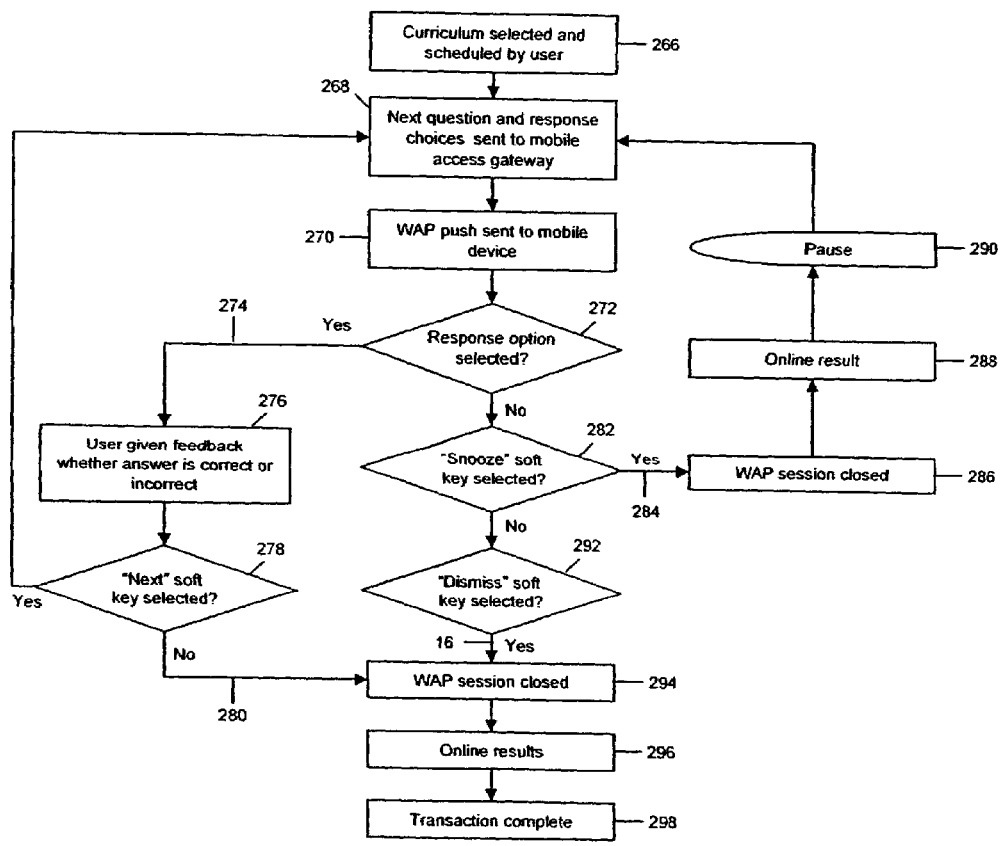
FIG. 11 illustrates a work flow diagram for the interactive learning method of the present invention.

FIG. 11 illustrates a work flow diagram for an interactive learning method of the present invention. In the interactive learning method, a user selects from various learning modules stored in learning curriculum in the learning services 266 of the application framework. Learning modules can include vocabulary lessons, science lessons, history lessons, math lessons, social science lessons or any other lesson defined by the user. Lessons typically consist of a question with multiple responses that the recipient can select from, however, the lessons can be in the form of a statement. Once the curriculum is selected, questions or statements are scheduled to be sent to the user using WAP Push based on the scheduling criteria set up by the user. At the scheduled time, the next question in the module is sent to the user's wireless device from the web application server to the mobile access gateway 268. Upon receiving the interactive message, the mobile access gateway pushes the interactive message to the user's wireless device 270. The user's wireless device receives the interactive message with the question and possible answers and a browser session is started by a session initiation application (SIA). The SIA displays a screen with the question and possible answers.

Once the question and possible answers appear on the screen of the user's wireless device, the user may select an answer corresponding to a pre-assigned response key 272. If the user selects an answer 274, feedback is given to the user showing whether the selected answer was correct or incorrect 276. If the incorrect answer was selected, feedback given to the user includes the correct answer that should have been selected. After receiving feedback, the user may select to have the next scheduled question pushed to their wireless device and continue the session or terminate the session 278. If the user elects to continue the session, the process is repeated starting with step 268. If the user elects to terminate the session 280, the WAP session is closed 294. The summary of the user's session, i.e. which questions were and were not answered correctly, is available using a computer accessing the Internet 296 and the transaction has been completed 298.

If the user does not want to answer the question, the user may respond to the question. by selecting a pre-assigned response key corresponding to a snooze feature 282. Selecting the snooze message key 284 closes the interactive learning method and a pre-defined delay occurs before the question is again pushed to the user's wireless device. After selecting the snooze key, the interactive learning method is closed 286. The status or results of the user's responses/answers are available on-line 288. The interactive learning method is then paused 290 for the length of time specified by the snooze key. After a specified time period is over, the question and answers are resent by the mobile access gateway and steps 268, 270 and 272 are repeated.

The recipient can choose to cancel the interactive learning session by selecting a pre-assigned response key corresponding to a dismiss feature 292. By dismissing the interactive learning session, the question will not be resent to the user and the session is closed 294. The summary of the user's session, i.e. which questions were and were not answered correctly, is available using a computer accessing the Internet 296 and the transaction has been completed 298.

Figure 12A:
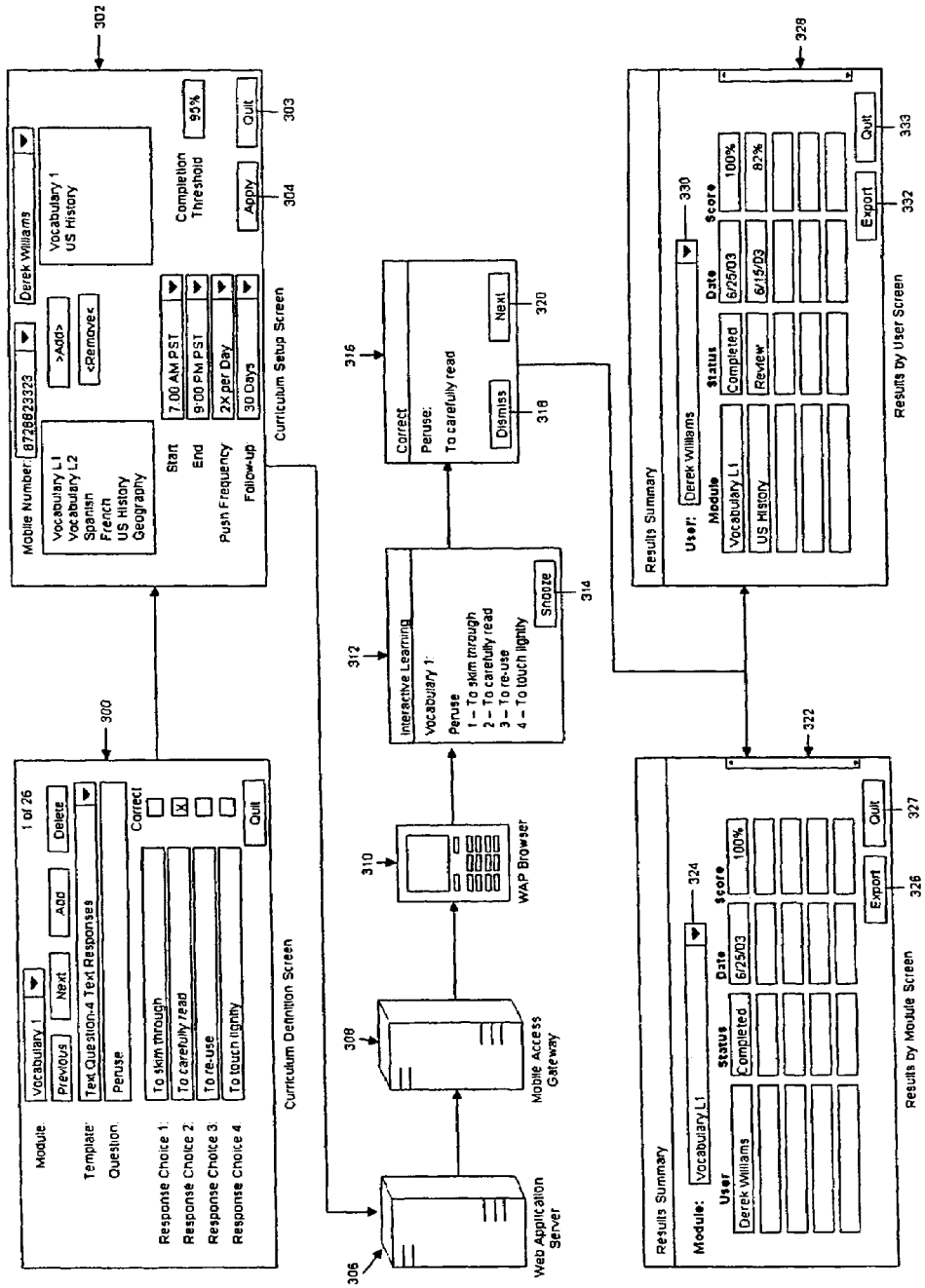
FIG. 12a illustrates a method of pushing an interactive question to the wireless device of a user.

FIG. 12a illustrates a method of the interactive learning method of the present invention. A template 300 is utilized by a user to enter curriculum. A computer connected to the Internet or a wireless device can be used to access the template. In the template is a drop down box that allows the user to select from a variety of templates. Templates can vary, such as requiring a varying amount of response options to be entered (i.e. 4 response options, 6 response option, etc.) as well as the type of data used for the question and response options. The question and response options can be a graphic image, a sound, animation, WML, MIME, a video clip or a turn based interactive game.

The user enters the question, response choices and specifies which response is correct. One of the template forms that can be specified is random incorrect responses wherein the web application server randomly picks incorrect responses to a question by randomly selecting from a pool of correct responses entered for other questions in the module and presenting them as incorrect response choices to the current question. This method greatly simplifies developing a module because instead of having to input up to three incorrect answers per question, the user needs to only specify each question and its correct response.

Once the curriculum has been entered, the user uses a curriculum set up screen 302 to select the curriculum as well as the timing and frequency for questions to be pushed to his wireless device. The start and end time defines the time when questions will periodically be pushed to the user's wireless device and the frequency defines how many times the questions are pushed to the user's wireless device during the start and end time. For example, the user can select to have a question sent to his wireless device twice per day. Furthermore, the user can specify if the questions are to be presented in a game mode. When game mode is selected, time between presentation of the question and response choices and user response can be set so that if the question is not answered within the specified window of time, it is considered a wrong answer. Also, during game mode, the wireless device can vibrate, play a specific sound and scoring can be utilized to give points for quickness and accuracy so a total score is calculated at the end of the module. In the curriculum set up screen 302, the user can also select a completion threshold which sets the percentage of accuracy that is required in review, mastery drilling and post-testing before moving onto the next module. The set up screen 302 also allows the user to select a follow-up time period which is a period after competency is reached that questions will be randomly sent to the user for follow-up review.

If the user chooses to cancel the interactive learning session prior to sending the set up screen to the application server 306, the user selects the quit button 303 located on the set up screen 302. However, if the user chooses to send the set up screen to the application server 306, the user selects an apply button 304 located on the set up screen after being filled in. After selecting the apply button 304, the user settings are saved on the web application server 306 and questions are scheduled to be sent to the user's wireless device. At the scheduled time, the questions are pushed to the mobile access gateway 308 which the pushes the question and responses to the wireless device via a WAP browser 310.

Once the question is pushed to the user's wireless device, a browser session is started by the Session Initiation Application (SIA) which displays a screen 312 with the question and response options corresponding to pre-assigned response keys. The user has the option of selecting one of the pre-assigned response keys in response to the question or selecting a snooze button 314. If the user selects the snooze button 314, the session is terminated and the question and responses are resent to the user at a later time, such as in 60 minutes. If the user selects one of responses corresponding to one of the pre-assigned response keys, the user receives instant feedback whether the response selected was correct or incorrect 316. When receiving the feedback, the user is given the option of selecting a dismiss button 318 or a next button 320. Selecting the dismiss button 318 cancels the session and selecting the next button 320 the user is requesting the additional questions in the curriculum be pushed to his wireless device.

Users can access a summary using a computer connected to the Internet. The summary shows and status and results by module 322 and as well as by users 328. The summary by module 322 allows the user to select various modules by using a drop down list 324. Once selected, user summary information is displayed for the selected module. An export button 236 allows the summary information to be exported to a comma delimited text file for use in a spreadsheet application for further analysis. A quit button 327 exits the user out of the summary. The summary by user 328 allows the user to select various users by using a drop down list 330. Once selected, module summary information is displayed for the selected user. As with the summary by module, an export button 332 allows the summary information to be exported to a comma delimited text file for use in a spreadsheet application for further analysis. A quit button 333 exits the user out of the summary.

An example of the interactive learning method is shown in FIG. 12a. A vocabulary word, peruse, is entered along with four possible answers. Several vocabulary words with respective answers can be stored on the application server to be later sent to help a person study. This method is not related to vocabulary and can also include questions relating to math, history, a foreign language, geography, trivia etc.

Figure 12B:
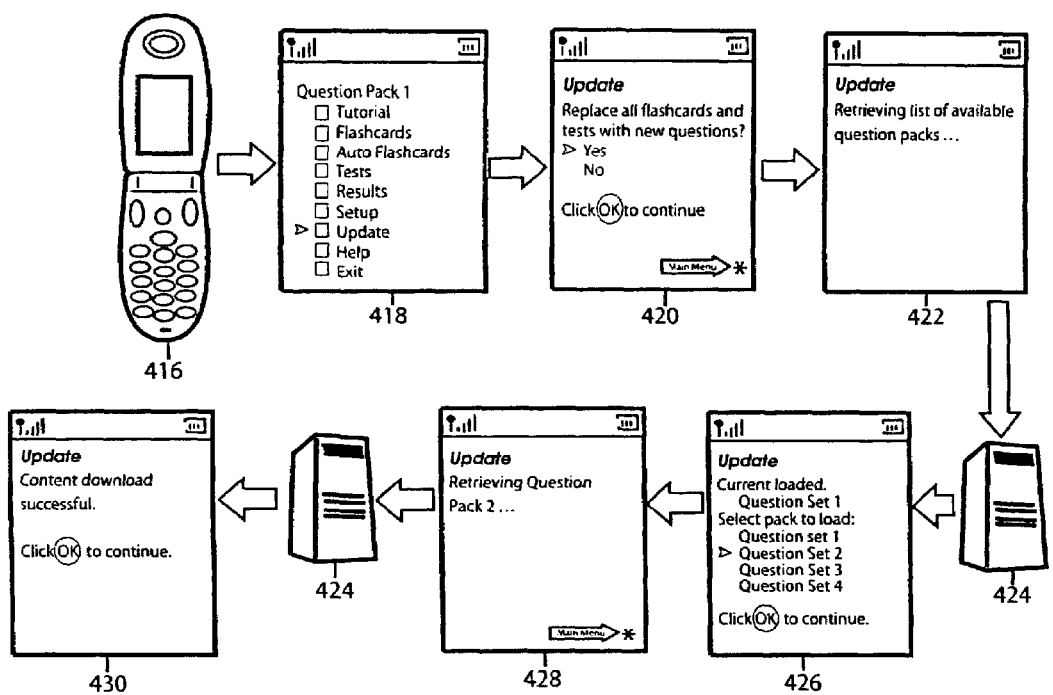
FIG. 12b illustrates a method of pushing or downloading additional test questions to the wireless device of a user

FIG. 12b illustrates a method of pushing or downloading additional content to the wireless device of a user. After users go through all the questions in the original download, new questions can be downloaded without having to install a new application on the wireless device 416. To download additional test questions, the users selects an update key from a menu 418 displayed on the user's wireless device. After selecting the update key, a message 420 is displayed requesting the user to confirm that an update of test questions is requested and informing the user that the flashcards and test questions will be replaced with new questions. The user confirms the update by selecting an "OK" button which causes a message to be displayed on the user's device indicating that a list of available question packs are being retrieved 422 from the server 424. Next the current questions pack installed on the user's wireless device is displayed along with a list of available question packs that can be installed 426. From this list, the user selects the question pack to download and selects and "OK" button. Upon selection of the "OK" button, a message is displayed indicating that the question pack selected is being retrieved 428. The selected question pack is retrieved from the server 424 and once the question pack has been downloaded, a message is displayed indicating the download is successful 430. The user then selects an "OK" button to continue.

Figure 12C:
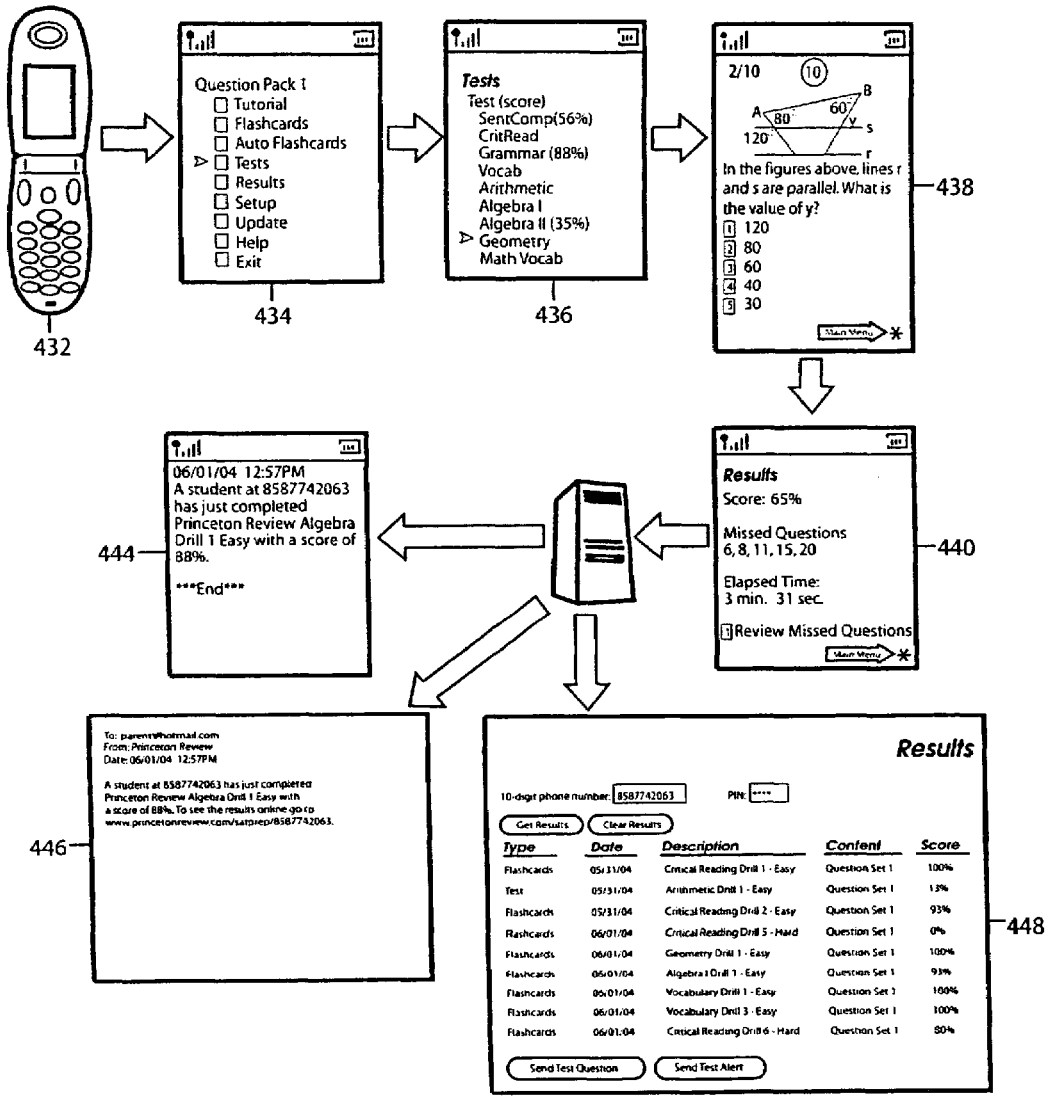
FIG. 12c illustrates a method of uploading test scores achieved from answering the test questions to the wireless device of a user.

FIG. 12*c* illustrates a method of uploading test scores achieved from answering the test questions to the wireless device of a user. The ability to provide the test scores of users allows a user to chart progress from a personal computer using a Web browser. For example, parents whose children are studying for tests, such as the SAT®, can obtain feedback and updates on the progress of their children. From the wireless device 432, a user can display a main menu 434 from which the user can select various services including setup where the user can instruct the application to automatically upload test and drill scores to the Web as tests and drills are completed. With this option turned on, scores are automatically uploaded to the Web and parents and students can access a history of prior scores using a personal computer and Web browser When a user answers a series of test questions, the test scores can be sent to the user or another user, such as the user's parents from the server 442 storing the information. The test scores are sent either via an SMS message 444, via email 446 or via on-line or web browser 448.

Figure 13:
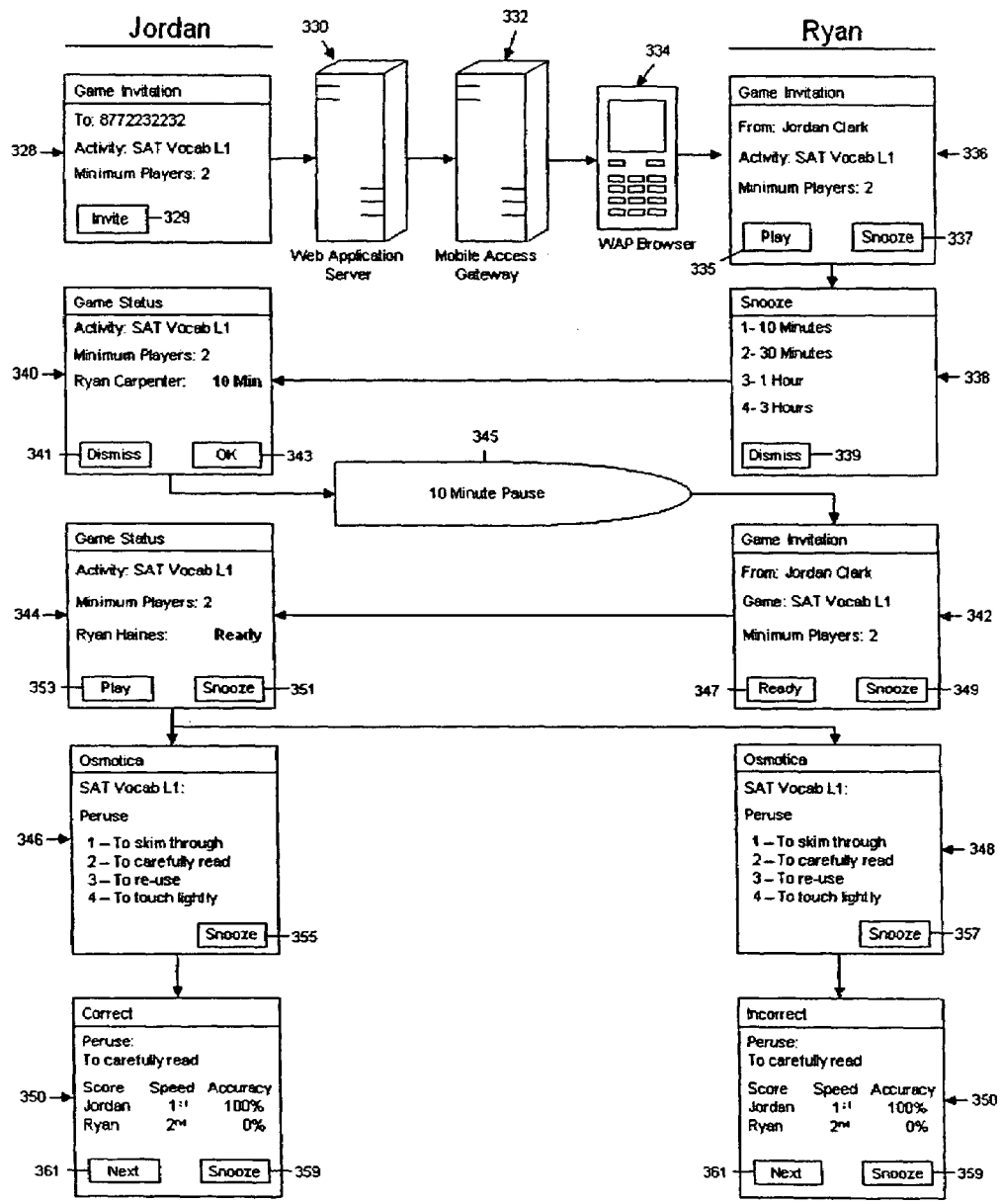
FIG. 13 illustrates an example of the interactive multi-player game invitation method combined with the interactive learning method.

FIG. 13 illustrates an example or the interactive multi-player game invitation method combined with the interactive learning method. In this method, an invitation can be composed to join a game 328. The sender enters the phone number, activity or game and the desired number of players required to play the game by accessing a template on his wireless device. Once this information has been filled in, the sender selects an invite button 329 and the invitation is sent to the invitee or player as a WAP Push message.

After selecting the invite button 329, the invitation is sent to a web application server 330 which immediately sends the message to a mobile access gateway 332. The mobile access gateway verifies that the invitee's wireless device has a WAP browser 334 and pushes the invitation to the invitee's wireless device. Once sent to the invitee's wireless device, a browser session is initiated by the Session Initiation Application (SIA) and displays a screen showing the invitation 336. The invitee has the option of selecting a play button 335 or a snooze button 337. If the invitee selects the play button 335, a message is sent to the sender indicating that the invitee is ready to play. If the invitee does not want to play at the present moment, or does not want to play the game at any time, the sender selects the snooze button 337.

Upon selecting the snooze button 337, a display screen 338 with several pre-assigned response keys and a dismiss button 339 are displayed on the invitee's wireless device. Selecting the dismiss button 339 closes the interactive session and the invitee will not receive the invitation again. The pre-assigned response keys correspond to the length of snooze or delay before the invitation is resent to the invitee. Selecting one of the pre-assigned response keys will terminate or pause the interactive session for a period of time that the invitee selected. When a invitee selects the snooze button 337 and selects the length of pause, a status screen 340 is sent to the sender indicating that the player has selected the snooze button 337 and the length of pause that the invitee has selected. Upon receiving this screen, the sender can select a dismiss key 341 and close the interactive session or select and OK button 343 accepting the invitee's delay and the pause selected by the invitee occurs 345.

After the length of pause selected by the invitee, a display screen showing the invitation 342 is pushed to the invitee's wireless device. The invitee now has the option of selecting a ready button 347 or another snooze button 349. If the invitee still does not want to play the game or activity at the present moment, the player selects the snooze button 349 and the process as described with reference to screen 338 is repeated. If the invitee selects the ready button 347, a display screen 344 is sent or pushed to the sender advising the sender that the invitee is available to play. Upon receiving this screen 344, the sender can select a snooze key 351 and the process as described with reference to screen 338 is repeated or select a play button 353 and the game is initiated. Upon initiating the game, the first question is pushed to the wireless device of both the sender 346 and the invitee 348. Both the sender and invitee have the option of again selecting snooze keys 355, 357. If either the sender or invitee select the snooze key, the process as described with reference to screen 338 is repeated. If both the sender and invitee opt to play, each choose a response to the question and display screens 350 are pushed to the wireless device of each indicating whether each selected the correct response to the question. Upon receiving the display screens 350, both the sender and invitee have the option of selecting a snooze button 359 or a next button 361. If either the sender or the invitee select the snooze button 359, the process as described with reference to screen 336 is repeated. If the next button 361 is selected by both the sender and invitee, a new question is sent to both the sender and the invitee and the game continues.

An example of the interactive multi-player game method combined with the interactive learning method is shown in FIG. 13. In this example, Jordan sends an invitation to Laura Cox to an activity, SAT® Vocab 1, on their wireless devices. When Laura is ready to play, the game relating to learning vocabulary is initiated on each of their wireless devices.

Figure 14:
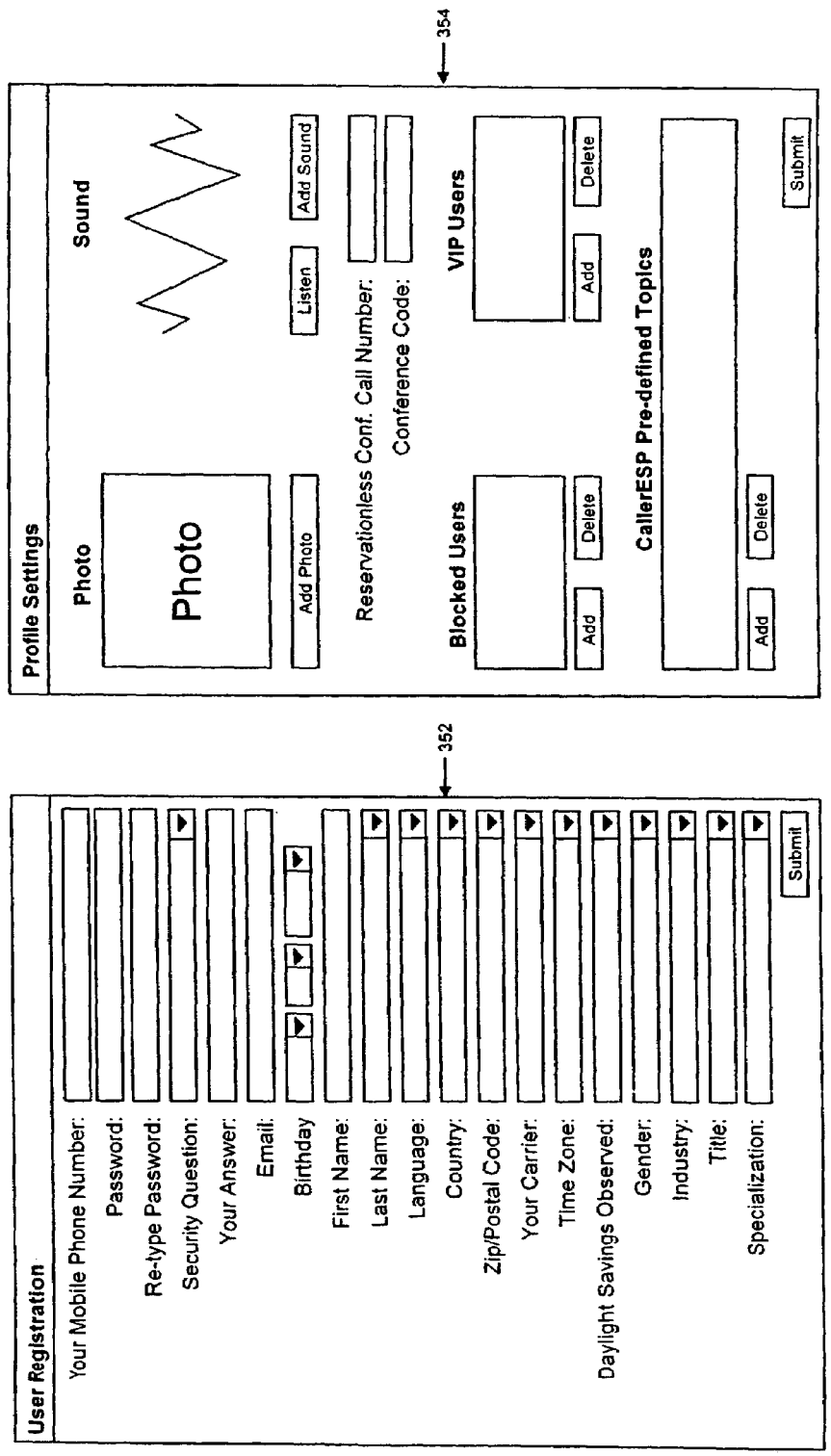
FIG. 14 illustrates a user registration and profile forms of the present invention.

Each user must fill out a registration form and profile settings to participate in an interactive messaging session. FIG. 14 illustrates an example of a user registration form 352 and profile settings 354. In the user registration, the user can enter information such as their wireless phone number, password, security question, answer to security question, email address, birthday, name, address, wireless phone carrier, etc. In the profile settings, the user can add a photo of themselves, sounds, conference call number, conference code, a list of blocked users, a list of VIP users, etc.

Figure 15:
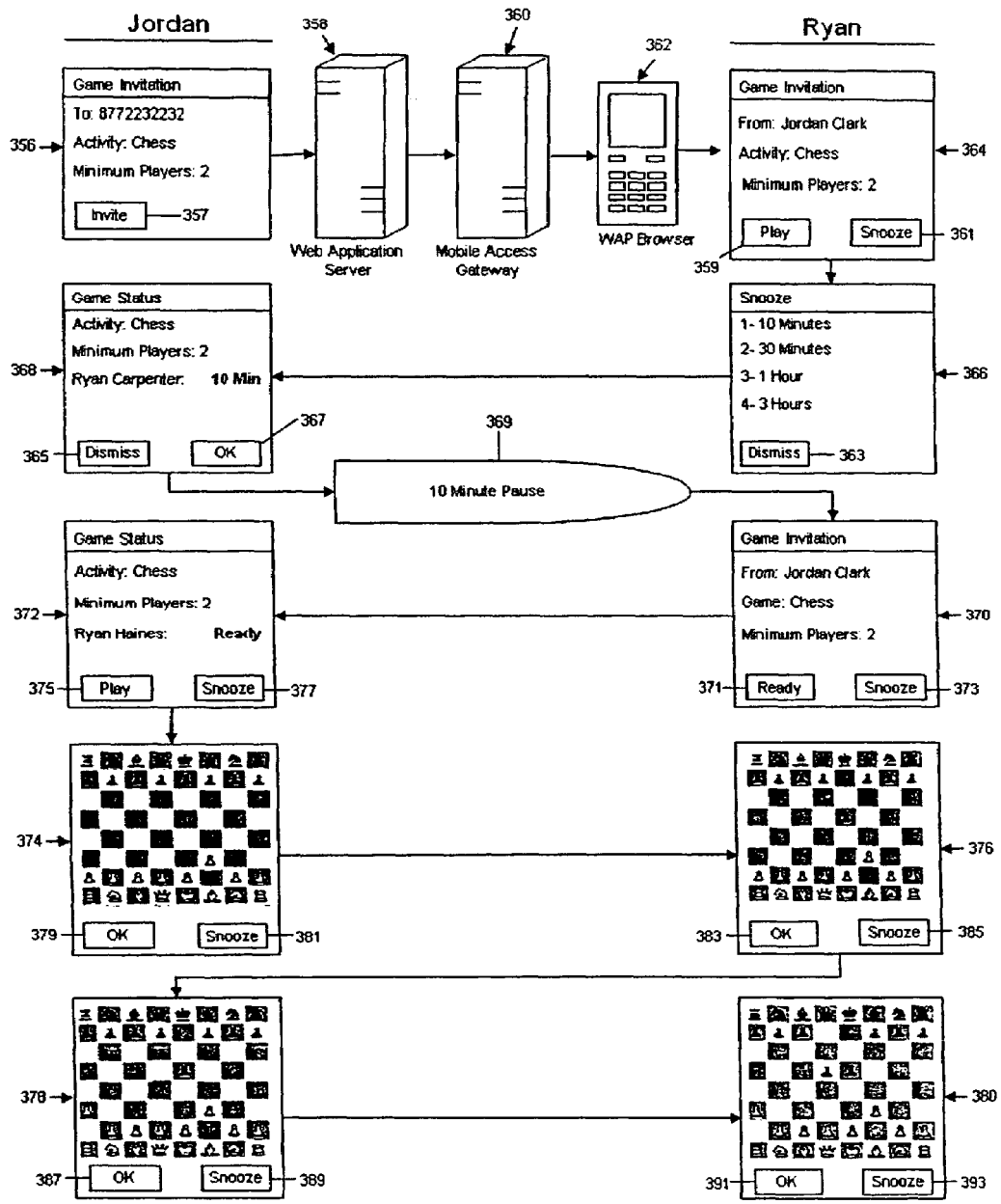
FIG. 15 illustrates an example of a turn based interactive game utilizing the interactive messaging system of the present invention.

Turning to FIG. 15, an example of a turn based interactive game utilizing the interactive messaging system of the present invention is illustrated. An invitation can be composed to initiate a turn based interactive game 356. The sender enters the phone number, the type of game and the desired number of players required to play the game by accessing a template on his wireless device. Once this information has been filled in, the sender selects an invite button 357 and the invitation is sent to the invitee or player as a WAP Push message.

After selecting the invite button 357, the invitation is sent to a web application server 358, which immediately sends the message to a mobile access gateway 360. The mobile access gateway verifies that the invitee's wireless device has a WAP browser 362 and pushes the invitation to the invitee's wireless device. Once sent to the invitee's wireless device, a browser session is initiated by the Session Initiation Application (SIA) and displays a screen showing the invitation 364. The invitee has the option of selecting a play button 359 or a snooze button 361. If the invitee selects the play button 359, a message is sent to the sender indicating that the invitee is ready to play. If the invitee does not want to play at the present moment, or does not want to play the turn based interactive game at any time, the sender selects the snooze button 361.

Upon selecting the snooze button 361, a display screen 366 with several pre-assigned response keys and a dismiss button 363 are displayed on the invitee's wireless device. Selecting the dismiss button 363 closes the interactive session and the invitee will not receive the invitation again. The pre-assigned response keys correspond to the length of snooze or delay before the invitation is resent to the invitee. Selecting one of the pre-assigned response keys will terminate or pause the interactive session for a period of time that the invitee selected. When a invitee selects the snooze button 361 and selects the length of pause, a status screen 368 is sent to the sender indicating that the player has selected the snooze button 361 and the length of pause that the invitee has selected. Upon receiving this screen, the sender can select a dismiss key 365 and close the interactive session or select and OK button 367 accepting the invitee's delay and the pause selected by the invitee occurs 369.

After the length of pause selected by the invitee, a display screen showing the invitation 370 is pushed to the invitee's wireless device. The invitee now has the option of selecting a ready button 371 or another snooze button 373. If the invitee still does not want to play the turn based interactive game at the present moment, the invitee selects the snooze button 373 and the process as described with reference to screen 366 is repeated. If the invitee selects the ready button 371, a display screen 372 is sent or pushed to the sender advising the sender that the invitee is available to play. Upon receiving this screen 372, the sender can select a snooze key 377 and the process as described with reference to screen 366 is repeated or select a play button 375 and the turn based interactive game is initiated. Upon initiating the turn based interactive game, the turn based interactive game is pushed to the wireless device of the sender 379. Although chess is illustrated as the turn based interactive game in FIG. 15, any other type of turned based game, such as checkers, can be utilized.

Upon receiving the turn based interactive game, the sender has the option of again selecting a snooze key 381. If the sender selects the snooze key 381, the process as described with reference to screen 364 is repeated. If the sender opts to play the turn based interactive game, the sender selects a turn or location to move the chess piece by using a rocker switch on the sender's wireless device. Once the rocker switch positions a cursor on the location that the chess piece is to be moved to, the sender selects the OK button 379 and the senders move is sent to the invitee. Sending the move causes the turn based interactive game to initiate 376 on the invitee's wireless device and illustrate the sender's move. After receiving the sender's first move, the invitee has the option of again selecting a snooze key 385. If the invitee selects the snooze key 385, the process as described with reference to screen 366 is repeated. If the invitee opts to play the turn based interactive game, the invitee selects a move or location to move the chess piece by using a rocker switch and sends his move to the sender by selecting the OK button 383. Upon selecting the OK button 383, the invitee's move appears on the wireless device 378 of the sender. As described previously, the sender again has the option of selecting a snooze button 389 or continuing to play the turn based interactive game and selecting an OK button 387 after deciding upon his move. If the OK button 387 is selected by the sender, the sender's move appears on a screen 380 on the invitee's wireless device. The invitee again has the option of selecting a snooze button 393 or continuing to play the turn based interactive game and selecting an OK button 391 after deciding upon his next move. This process continues until the completion of the game. Playing a turn based interactive game utilizing the present invention allows player to play at their leisure and respond with their next move at their convenience.

Figure 16:
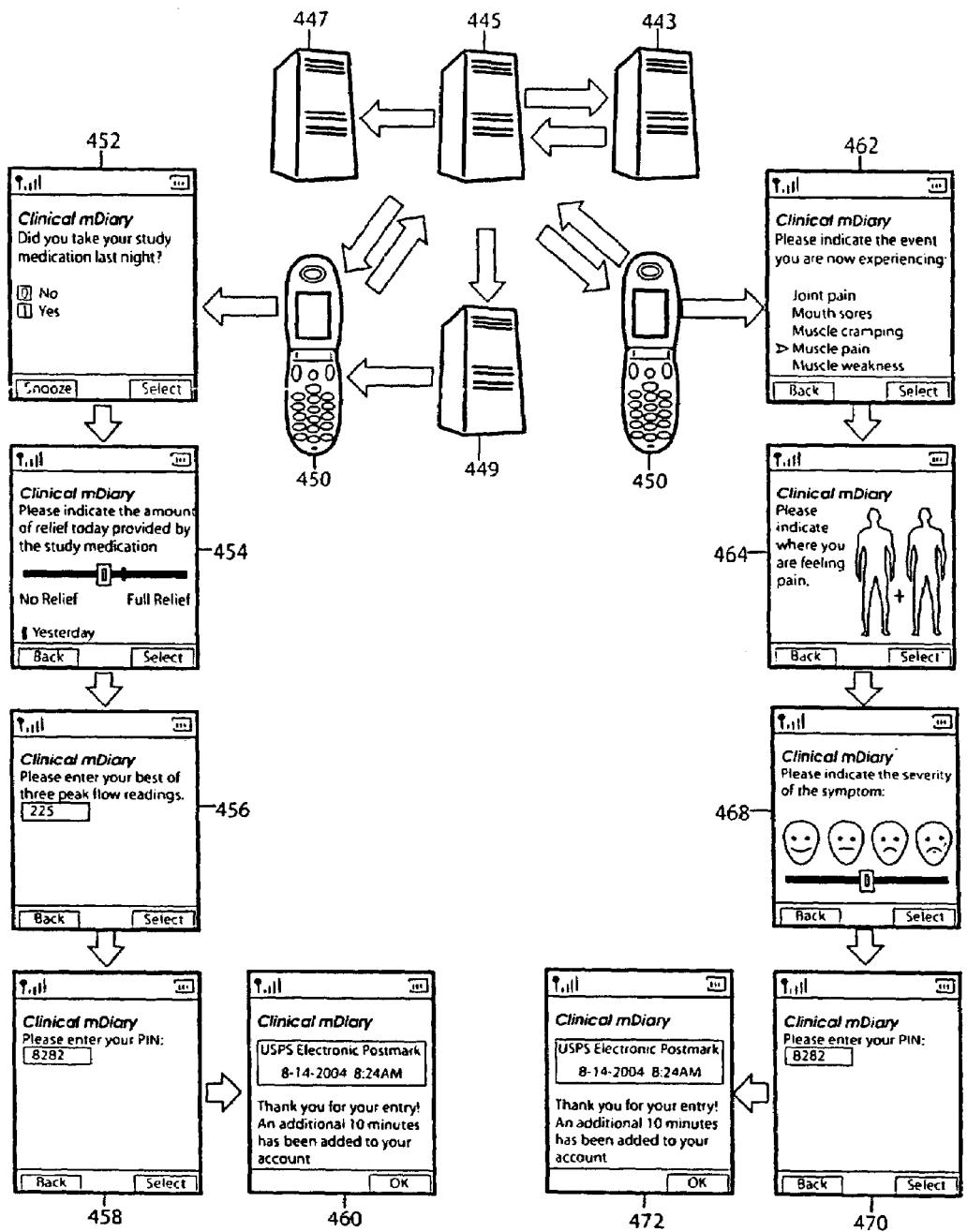
FIG. 16 illustrates a method of utilizing the template based interactive system of the present invention in clinical trials.

FIG. 16 illustrates a method of utilizing the template based interactive system of the present invention in clinical trials. In clinical trials, patients typically keep a paper diary of medication administration and adverse events caused by the medication. An electronic diary on a wireless device would improve the accuracy of the data and alerts sent to the patient's wireless device improve patient compliance. Transactions can originate as a clinical alert generated by a Web server on a pre-defined schedule. The alert is stored in an application server 445 and is pushed to a messaging gateway 449 which then sends it to the patient's wireless device 450 from and upon receiving the alert; the patient's wireless device emits a special ring tone. A message is displayed on the patient's wireless device 450 asking the patient if the patient took the study medication the night before 452. Next the patient is requested to identify the amount of relief provided by the study medication 454, the peak flow reading 456 and PIN number 458. The patient next sends the responses and a thank you message is sent to the patient for responding 460. To encourage participation in the study, the patient is provided with a wireless device and is rewarded with calling minutes to be used for personal use at the end of each template based interactive message transaction. At the end of the transaction, the screen displays, "Thank you for your input, an additional 10 minutes has been added to your account." In alternative embodiments, the reward of additional minutes can be used in other ways such as rewarding minutes for responding to game show quiz questions, parents rewarding minutes of use for a child's completing a test question properly and a survey sponsor rewarding minutes for responding to survey questions. Once the responses have been sent, the electronic authentication, described above, authenticates the message. The authentication server 443 creates a digital signature, timestamp and a recorded fingerprint of the data and a returned receipt. The electronic authentication receipt is a tracking number whereby all parties involved in an electronic transaction can access the authentication server 445 and verify the electronic signature, time stamp and content. After the patient enters the data, the data is sent back to application server and then sent to a global study database 447 for storage.

In addition to following intake of medication of a patient, the method also allows the patient to indicate any adverse event the patient is experiencing, such as joint pain, mouth scores, muscle cramping, muscle pain and muscle weakness 462. Once the patient has indicated the event, the patient is asked to indicate where the pain is 464, the severity of the pain 468 and PIN number 470 to verify the patient. The patient next sends the responses and a thank you message is sent to the patient for responding 472. As indicated above, once the responses have been sent, the electronic authentication and the authentication server creates a digital signature, timestamp and a recorded fingerprint of the data and a returned receipt. Again, the patient enters the data, the data is sent back to application server 445 and then sent to a global study database 447 for storage.

Figure 17A:
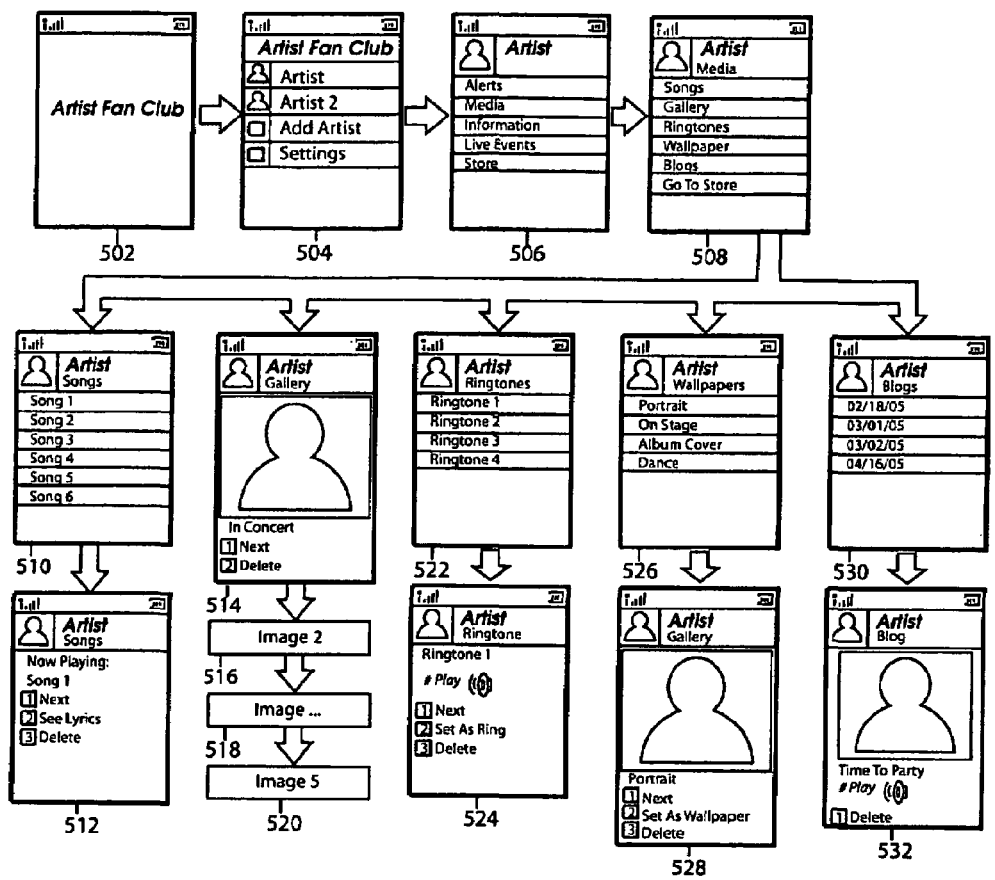
FIG. 17a illustrates an example of utilizing the interactive messaging system of the present invention to create a fan club.

FIG. 17*a* illustrates a method of utilizing the template based interactive system of the present invention to create artist fan clubs, that is follow the career of a famous individual or other topic of interest. In this method, a fan or user can utilize a wireless device to select an artist, such as a singer, band, or actor, or other topic of interest to add to the user's personal settings on the user's wireless device. First the user selects the artist fan club menu 502 from a wireless device and then chooses an artist that has already been selected by the user, adds new artists or changes the setting for the information displayed about the selected artist from another menu 504. Once the user has selected an artist, a menu appears with a list of options that the user can select from 506. In the example shown in FIG. 17*a*, the user selects the media option and a media option menu 508 appears on the wireless device with a list of options that the user can select from, such as songs, gallery, ringtones wallpaper, blogs and go to store. If the user selects songs from the menu, a songs menu 510 is displayed on the wireless device and the user can select one of the artist's songs to listen to. Once a song has been selected, a menu appears on the wireless device and the song is played over the wireless device 512. From this menu the user can select another song, see the lyrics of the song or delete the song from the user's wireless device. If the user selects gallery from the menu, a gallery menu 514 is displayed which allows user to scroll through additional menus of images of the artist 516, 518, 520 or the user can delete the artist from the gallery. If the user selects the ringtones menu 522, the user can select a ringtone to download to the user's wireless device 524. If the user selects the wallpapers menu 526, the user can select wallpaper to download to the user's wireless device 528. If the user selects the blogs menu 530, the user can select a blog from a particular date to download to the user's wireless device and then delete the blog if desired 532.

Figure 17B:
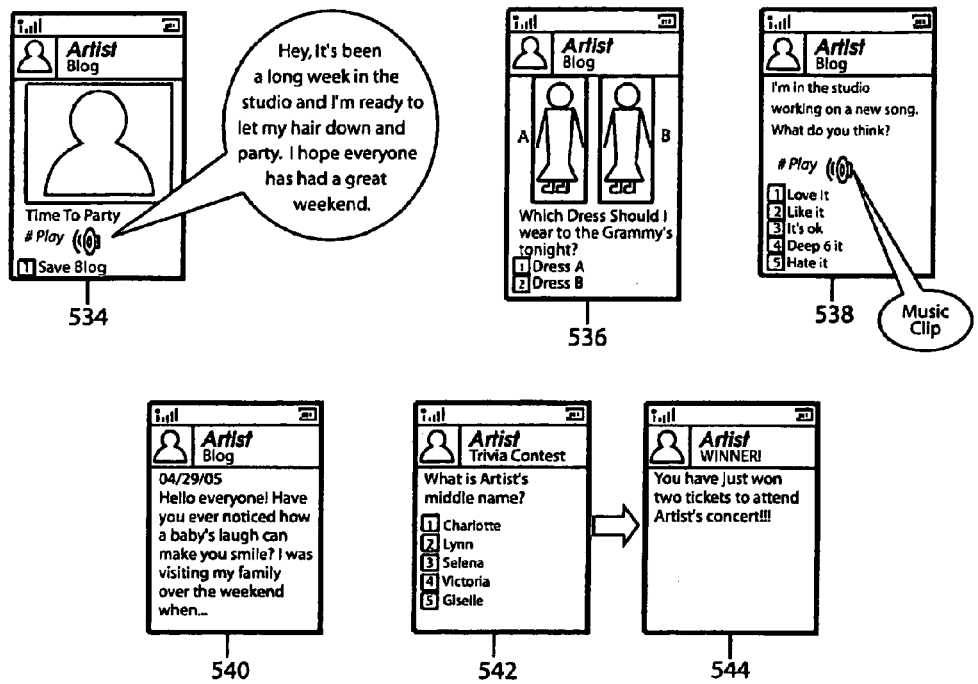
FIG. 17b illustrates an example of utilizing the interactive messaging system of the present invention to view a blog from an artist.

FIG. 17*b* illustrates an example of a blog from an artist 534. In this example, personal messages from the artist to the user are illustrated. The blogs allow the artist to interact with the user such as asking what dress the artist should where to the Grammy's 536, allowing a user to preview a new song and give an opinion 538, display a personal message 540, or have a trivia contest 542 which allows the user to win gifts such as tickets to attend the artist's concerts 544.

Figure 17C:
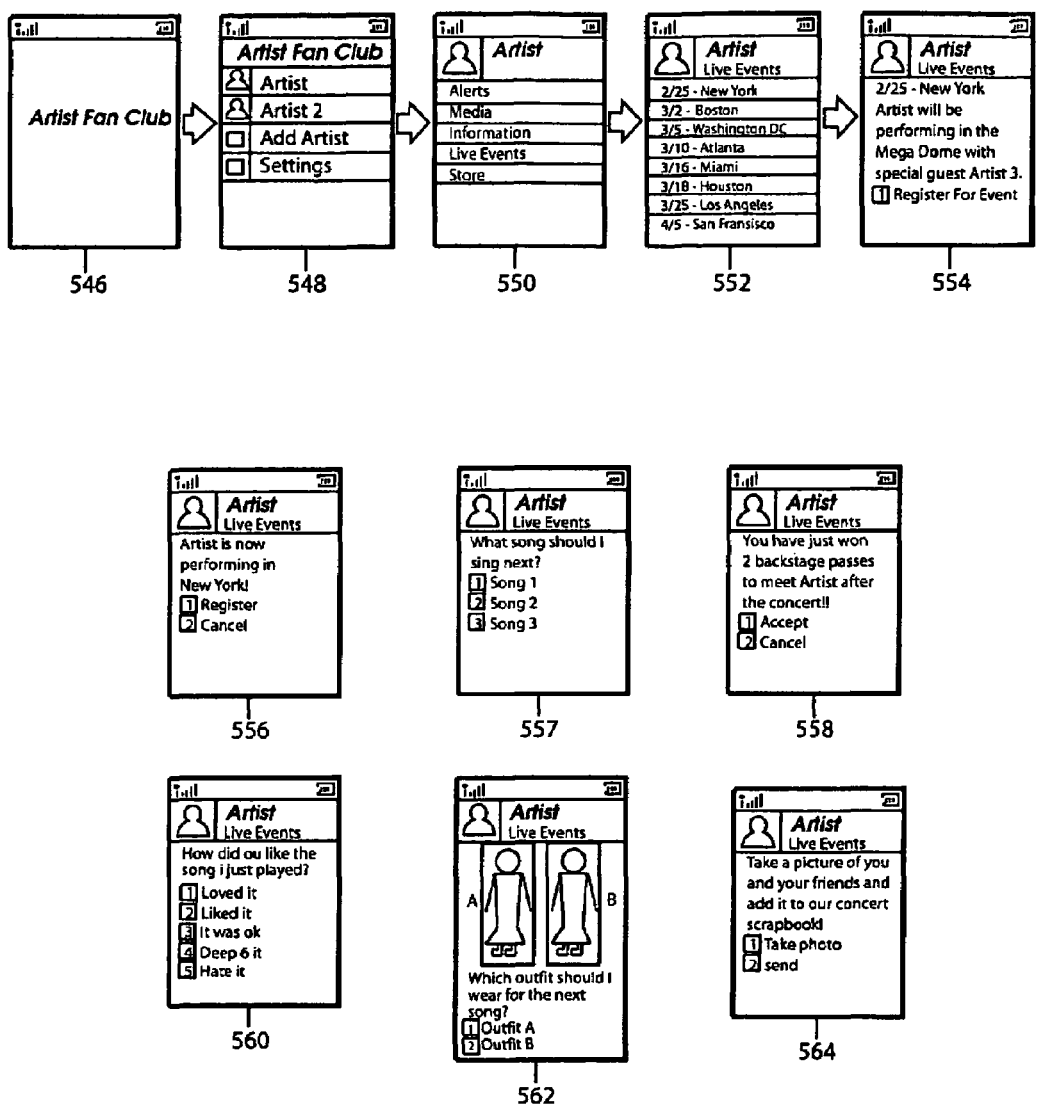
FIG. 17c illustrates an example of utilizing the interactive messaging system of the present invention to interacting with an artist during a live event.

FIG. 17*c* illustrates an example of a fan club that a user can utilize to select an artist, such as a singer, band, or actor, to add to the fan's personal settings on the fan's wireless device. First the user selects the fan club menu 546 from a wireless device and then chooses an artist or topic of interest that has already been selected by the user, adds new artists or topics of interest or changes the setting for the information displayed about the selected artist from another menu 548. Once the user has selected an artist, a menu appears with a list of options that the user can select from 550. In the example shown in FIG. 17*c*, the user selects the live events option 552 and a live events menu 554 appears on the wireless device illustrating the dates of concerts the artist is playing. Next, the user selects a concert that the artist will be performing and the user is given the option of registering for the event 554. The user can register for an event or concert that the artist is currently performing at 556 and select a song for the artist to sing next 557. It is possible for the user to win prizes by participating in the live event such as winning backstage passes to meet the artist 558. The user is also given the opportunity to judge the song 560, voting the next outfit for the artist to where 562, or taking a picture to add to the user's concert scrapbook if the user's wireless device has a camera 564.

Figure 17D:
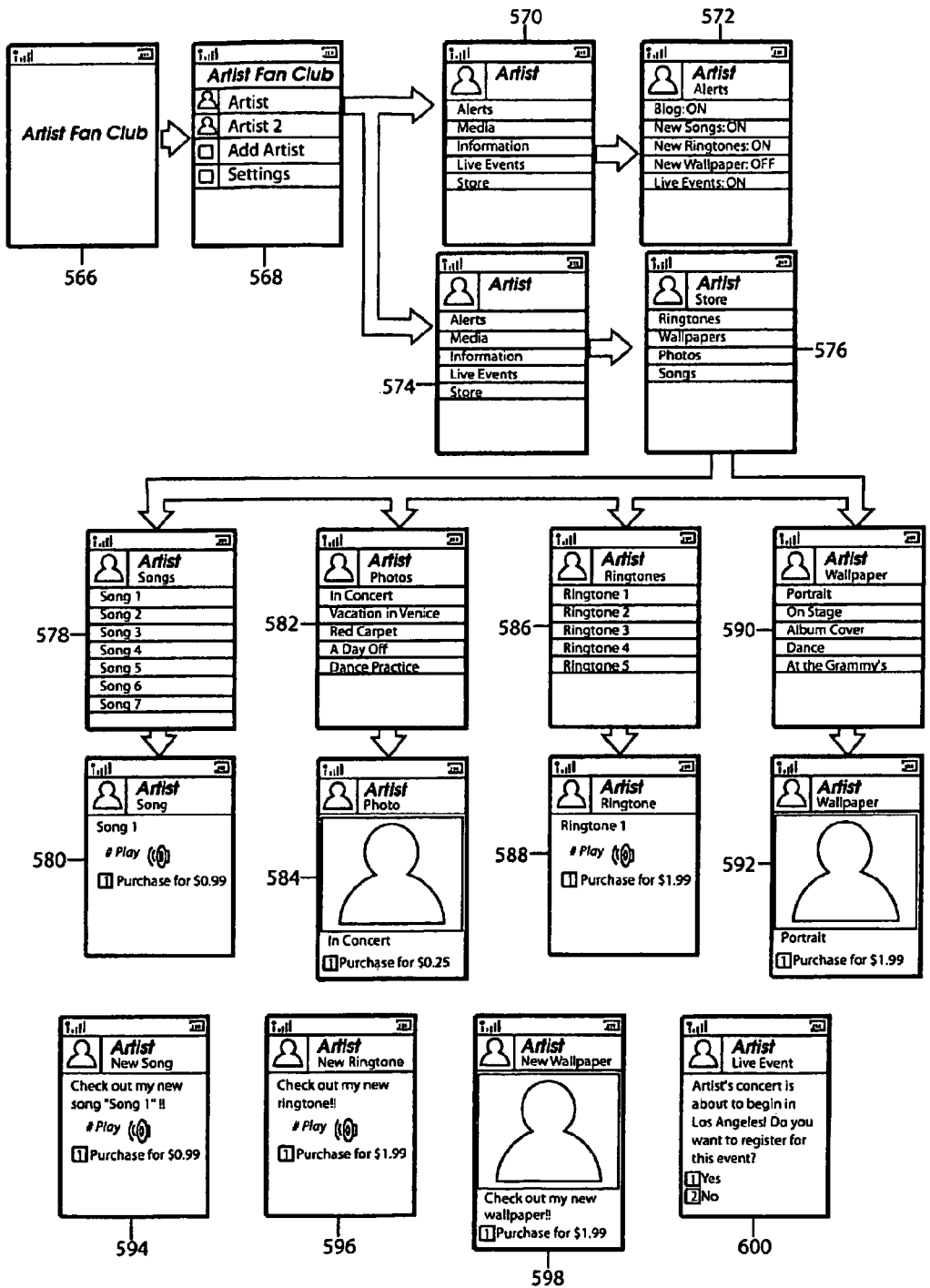
FIG. 17d illustrates an example of utilizing the interactive messaging system of the present invention to purchase items on-line.

FIG. 17*d* illustrates an example of a fan club that a user can utilize to select an artist, such as a singer, band, or actor, to add to the user's personal settings on the user's wireless device. First the user selects the fan club menu 566 from a wireless device and then chooses an artist that has already been selected by the user, adds new artists or changes the setting for the information displayed about the selected artist from another menu 568. Once the user has selected an artist, a menu appears with a list of options that the user can select from 570. In the example shown in FIG. 17*d*, the user selects the alerts option 552 and an alerts option menu 572 appears. The user can select two options from the menu 568, in FIG. 17*d*, the user also selects the store option 574 and a store options menu will also appear 576. If the user selects store from the menu, a store menu 576 is displayed on the wireless device and the user can select an item to purchase. Once an item to purchase has been selected, a menu appears on the wireless device giving the user particular items to purchase, such as songs 578, photos 582, ringtones 586 and wallpaper 590. Upon selecting an item to purchase a menu appears illustrating the cost of the item 580, 584, 588, 592. As discussed previously, the user selected the alerts options. As the alerts option has been selected, any time the artist has a new song, a new ringtone or new wallpaper 594, 596, 598, a message is immediately sent to the user of the new item and given the option to purchase. If an event is about to begin, an alert is sent to the user and the user who is given the opportunity to register for an event 600.

Figure 17E:
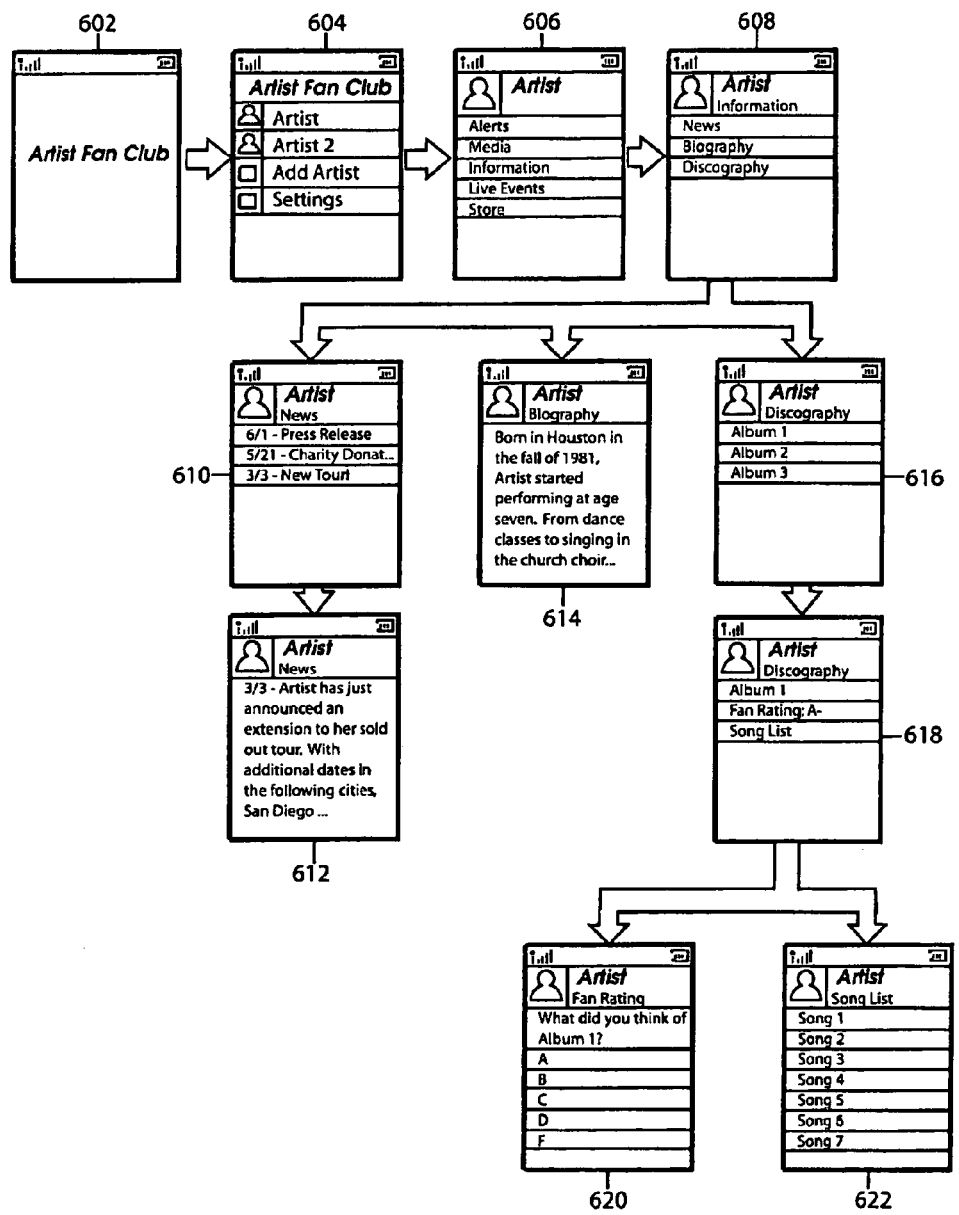
FIG. 17e illustrates an example of utilizing the interactive messaging system of the present invention to find out information about an artist.

FIG. 17*e* illustrates an example of a fan club that a user can utilize to select an artist, such as a singer, band, or actor, or other topic of interest to add to the user's personal settings on the user's wireless device. First the user selects the fan club menu 602 from a wireless device and then chooses an artist that has already been selected by the user, adds new artists or changes the setting for the information displayed about the selected artist from another menu 604. Once the user has selected an artist, a menu appears with a list of options that the user can select from 606. In the example shown in FIG. 17*e*, the user selects the information option and an information options menu 608 is displayed on the user's wireless device. Next the user selects between news of the artist, a biography of the artist and a discography of the artist. If the user selects news from the menu, a news menu 610 is displayed on the wireless device and the user selects a news item to read about the artist which then is displayed on the wireless device 612. If the user selects biography from the menu, a biography of the artist is displayed on the wireless device 614. If the user selects discography from the menu, a discography menu 616 is displayed listing the artist's albums and the user selects an album to receive information about such as the fan rating and the songs on the album, this information is displayed on menu 618. If the user selects fan rating, a fan-rating menu is displayed allowing the user to enter the user's person rating of the album. If the user select song list, the list of songs on the album is displayed on the song list menu 622.

Figure 17F:
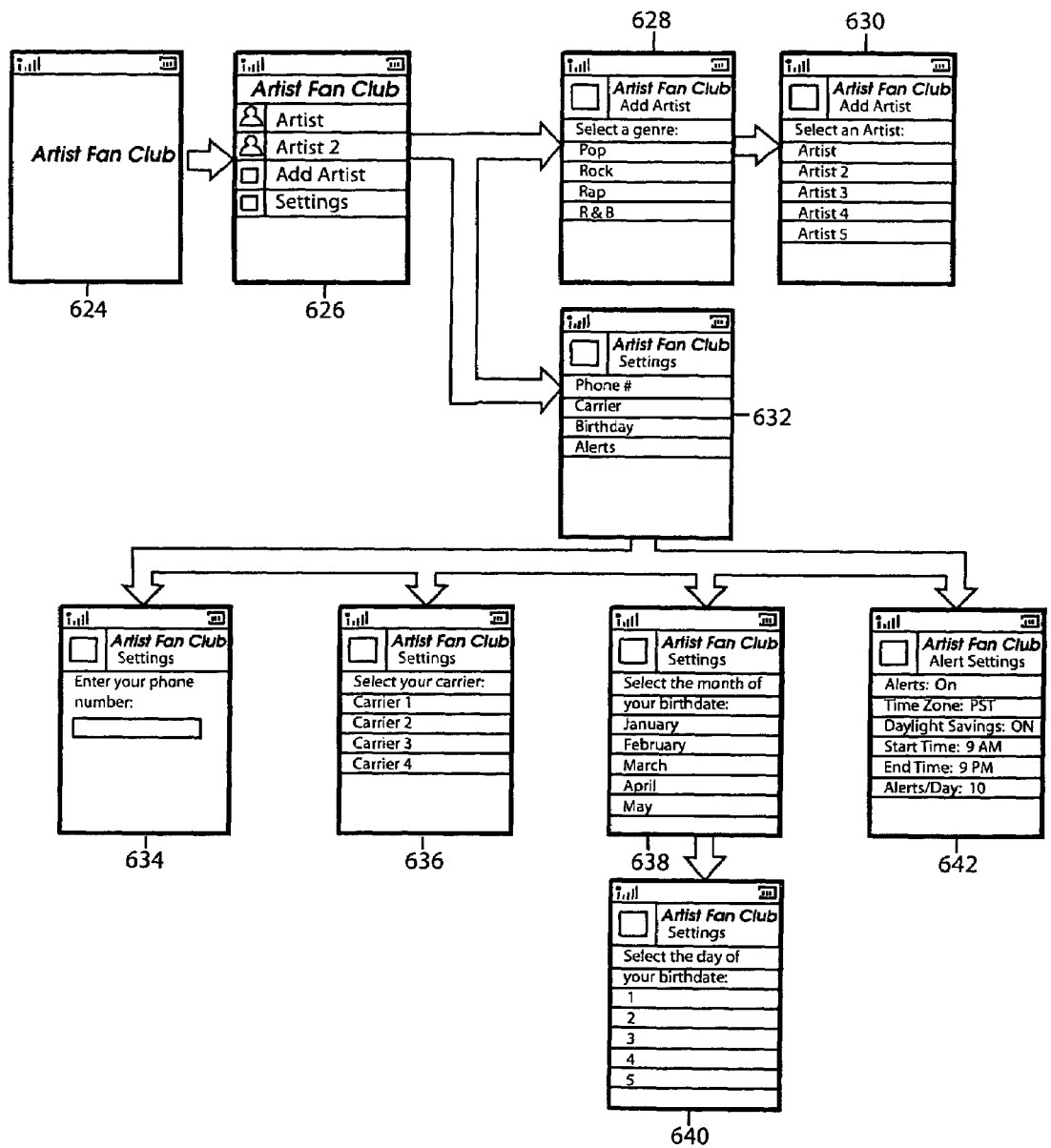
FIG. 17f illustrates an example of utilizing the interactive messaging system of the present invention to add a new artist to the user's fan club.

FIG. 17f illustrates an example of a fan club that a user can utilize to select an artist, such as a singer, band, or actor or topic of interest, to add to the user's personal settings on the user's wireless device. First the user selects the fan club menu 624 from a wireless device and then chooses an artist that has already been selected by the user, adds new artists or changes the setting for the information displayed about the selected artist from another menu 626. If the user wants to add a new artist, the user select add artist and an add artist menu is displayed 628 asking the user to select a genre such as pop, rock, pop and R&B. Once a genre is selected, the user selects an artist from menu 630. After selecting an artist, a display menu is displayed 632 and the user enters the user's phone number 634, selects the carrier being used 636, enters the user's birthday, month and day 638, 640 and filing set the alert settings 642. Alert settings include whether or not there will be any alerts, the time zone, if it is daylight savings, the start and end times of the alerts and the number of alerts per day.

Although an exemplary embodiment of the invention has been described above by way of example only, it will be understood by those skilled in the field that modifications may be made to the disclosed embodiment without departing from the scope of the invention, which is defined by the appended claims.

I claim:

1. A method for exchanging interactive messages with wireless devices, the method comprising the steps of:

selecting an event brokering template from a group of brokering templates, wherein the group of templates include an event brokering template for negotiating an event based interactive workflow and collaboration between a sender of an interactive message and at least one recipient of the interactive message, the event based interactive workflow includes response triggered events and non-response triggered events;

composing a message by filling in the selected template and transmitting the message to an application server, the message having at least one pre-assigned instant event key, the at least one pre-assigned instant event key defining actions of the workflow, and the sender assigning a response triggered event to correspond to the at least one pre-assigned instant event response key;

transmitting the message, using any enabling push technology, from the application server to at least one wireless device of the at least one recipient, the at least one recipient communicating with the sender of the message via the at least one wireless device;

receiving the message on the at least one recipient's wireless device to notify the at least one recipient to take a particular action;

communicating a response to the message through the application server to the sender, the response triggered by the at least one recipient selecting the at least one pre-assigned instant event key; and wherein the application server manages the event based interactive workflow and collaboration between the at least one recipient and the sender of the interactive message.

2. The method of claim 1, wherein the message asks the at least one recipient if the at least one recipient took medication that is part of a clinical trial.

3. The method of claim 2, further comprising the step of pushing a second message to the at least one recipient requesting the at least one recipient identify the amount of relief provided by the medication by selecting a second pre-assigned instant event key.

4. The method of claim 1, wherein the response triggered events trigger the application server to initiate an event.

5. The method of claim 1, wherein the message is transmitted from the application server to the at least one wireless device using push technology.

6. The method of claim 1, wherein a special ring tone is emitted on the at least one recipient's wireless device when the message is received.

* * * * *